US011944854B2

(12) United States Patent
Scarola et al.

(10) Patent No.: US 11,944,854 B2
(45) **Date of Patent: *Apr. 2, 2024**

(54) STOVE TOP FIRE EXTINGUISHING DEVICE

(71) Applicant: Suppressor, LLC, Nashville, TN (US)

(72) Inventors: Rick Scarola, Nashville, TN (US); John Berry, Franklin, TN (US); Dave Seeman, Franklin, TN (US); Evan Reese, Nashville, TN (US)

(73) Assignee: Suppressor, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,877

(22) Filed: Jul. 5, 2022

(65) Prior Publication Data

US 2022/0401768 A1 Dec. 22, 2022

Related U.S. Application Data

(63) Continuation of application No. 17/086,683, filed on Nov. 2, 2020, now abandoned, which is a continuation of application No. 16/399,436, filed on Apr. 30, 2019, now Pat. No. 10,821,312, which is a continuation-in-part of application No. 16/010,193, filed on Jun. 15, 2018, now Pat. No. 10,272,275, (Continued)

(51) Int. Cl.

| | |
|---|---|
| ***A62C 3/00*** | (2006.01) |
| ***A62C 35/02*** | (2006.01) |
| ***A62C 35/04*** | (2006.01) |
| ***A62C 35/10*** | (2006.01) |
| ***A62C 35/13*** | (2006.01) |
| ***A62C 37/00*** | (2006.01) |
| ***A62C 37/08*** | (2006.01) |
| ***A62C 37/11*** | (2006.01) |
| ***A62C 37/12*** | (2006.01) |
| *A62C 99/00* | (2010.01) |

(52) U.S. Cl.

CPC .............. *A62C 3/006* (2013.01); *A62C 35/02* (2013.01); *A62C 35/04* (2013.01); *A62C 35/10* (2013.01); *A62C 35/13* (2013.01); *A62C 37/00* (2013.01); *A62C 37/08* (2013.01); *A62C 37/11* (2013.01); *A62C 37/12* (2013.01); *A62C 99/0045* (2013.01)

(58) Field of Classification Search

CPC ......... A62C 3/006; A62C 37/12; A62C 35/13; A62C 99/0045; A62C 35/02; A62C 37/00; A62C 37/08; A62C 35/04; A62C 35/10; A62C 37/11

USPC ................ 169/26, 42, 52, 56, 57, 59, 65, 70

See application file for complete search history.

(56) References Cited

U.S. PATENT DOCUMENTS

| | | | | |
|---|---|---|---|---|
| 9,044,627 | B1 * | 6/2015 | Williams ............... | A62C 37/12 |
| 9,999,791 | B2 * | 6/2018 | Scarola .................. | A62C 35/13 |
| 2017/0157440 | A1 * | 6/2017 | Scarola .................. | A62C 37/00 |

* cited by examiner

*Primary Examiner* — Steven J Ganey

(74) *Attorney, Agent, or Firm* — Bradley Arant Boult Cummings, LLP; Blake M. Bernard

(57) ABSTRACT

An apparatus is disclosed for extinguishing a stovetop fire over a stovetop having a first burner, the apparatus including a container detachably mountable to a microwave positioned above the stove top. A supply of fire suppressant material is retained within the container. A heat responsive actuator is disposed on the container. When the container is mounted to the microwave over the first burner, and the fire actuates the heat responsive actuator, at least a portion of the supply of fire suppressant material falls from the container toward the first burner.

14 Claims, 17 Drawing Sheets

Related U.S. Application Data which is a continuation of application No. 15/815,314, filed on Nov. 16, 2017, now Pat. No. 9,999,791, which is a continuation of application No. 15/433,480, filed on Feb. 15, 2017, now Pat. No. 9,849,315, which is a continuation of application No. 15/276,741, filed on Sep. 26, 2016, now Pat. No. 9,604,081.

(60) Provisional application No. 62/254,252, filed on Nov. 12, 2015.

STOVE TOP FIRE EXTINGUISHING DEVICE

CROSS-REFERENCES TO RELATED APPLICATIONS

This application is a continuation of U.S. patent application Ser. No. 17/086,683 filed Nov. 2, 2020 entitled Stove Top Fire Extinguishing Device, which is a continuation of U.S. patent application Ser. No. 16/399,436 filed Apr. 30, 2019 entitled Stove Top Fire Extinguishing Device (which is now U.S. Pat. No. 10,821,312), which is a continuation-in-part of U.S. patent application Ser. No. 16/010,193 filed Jun. 15, 2018 entitled Stove Top Fire Extinguishing Device (which is now U.S. Pat. No. 10,272,275), which is a continuation of U.S. patent application Ser. No. 15/815,314 filed Nov. 16, 2017 entitled Stove Top Fire Extinguishing Device (which is now U.S. Pat. No. 9,999,791), which is a continuation of U.S. patent application Ser. No. 15/433,480 filed Feb. 15, 2017 entitled Stove Top Fire Extinguishing Device (which is now U.S. Pat. No. 9,849,315), which is a continuation of Ser. No. 15/276,741 filed Sep. 26, 2016 entitled Stove Top Fire Extinguishing Device (which is now U.S. Pat. No. 9,604,081), which claims benefit of U.S. Provisional Patent Application Ser. No. 62/254,252 filed Nov. 12, 2015 entitled Stove Top Fire Extinguishing Device, all of which are herein incorporated by reference in their entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to an apparatus for extinguishing a fire on a stovetop. Grease fires are a common occurrence in many homes when food or oil is left unattended on a stovetop. Grease fires grow rapidly and can quickly cause fire damage to nearby cabinetry and kitchen structures, and can eventually lead to full fledge house fires if they are not put out in time.

More specifically, the present disclosure relates to an apparatus for extinguishing or suppressing a fire which develops on a stove top before the fire can spread to nearby cabinetry or kitchen structures. Conventional stovetop fire prevention devices include various large and bulky apparatuses that can be positioned above a stovetop and can release a fire suppressant material such as baking soda or water onto a detected stovetop fire in order to suffocate the fire. Many conventional kitchen units also include a hood for venting smoke from the stovetop, the hood positioned above the stove top and having an inner recess. In such kitchens with hoods, the fire prevention devices can be positioned in the recess of the hood such that the devices are not readily visible to an observer of the kitchen unit.

However, in more recent years it has become increasingly common, especially in large apartment and condo complexes, for the kitchen to include a microwave above the stovetop for space saving reasons, the microwave lacking any inner recess to position fire prevention devices. As such, conventional bulky and unaesthetically pleasing fire prevention devices are positioned below the bottom of the microwave and can be readily visible to an observer of the kitchen unit. Some conventional devices may also undesirably extend into a user's cooking space below the microwave because of their size and height. Additionally, many conventional microwaves to do not extend over a front burner on the stovetop, such that conventional devices capable of extinguishing fires on a front burner of the stovetop undesirably extend outward from the microwave, further decreasing the aesthetic appearance of the devices. Furthermore, some conventional devices are of such a large size and weight that the devices must be mounted directly to a wall adjacent and beneath the microwave, which is undesirable.

The size and unaesthetic appearance of conventional devices can force a builder to have to choose between aesthetics and safety, often times the builder choosing aesthetics to ensure sales of the living units. Additionally, even if builders choose to include conventional fire prevention devices in their properties, the resident once occupying the apartment or living space often chooses to remove the fire prevention device for aesthetic reasons. As such, the unaesthetic appearance of conventional devices can deter proper use of such devices, which can ultimately decrease the safety of the kitchen and increase the likelihood of a stovetop fire outbreak spreading to nearby fixtures, which is undesirable.

What is needed then are improvements to stove top fire extinguishing devices.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is an apparatus for extinguishing a fire on a stovetop having a first burner and a second burner, a microwave positioned above the stovetop. The apparatus can include a container detachably mountable to the microwave, the container having a closure movable between an open position and a closed position on the container. A projection member can be connected to the container, the projection member movable with respect to the container between a retracted position and an extended position. A supply of fire suppressant material can be retainable within the container when the projection member is in the retracted position and the closure is in the closed position. A heat responsive actuator can be disposed on the container. When the supply of fire suppressant material is retained within the container, the container is mounted to the microwave over the first burner, and the fire on the stovetop actuates the heat responsive actuator, the closure moves to the open position and the projection member moves to the extended position, the projection member forcing a second burner portion of the supply of fire suppressant material toward the second burner.

In some embodiments, the projection member can be biased toward the extended position, for instance by a torsion spring. In other embodiments, the container can include a frame, the closure pivotally connected to the frame and rotatable with respect to the frame between an open and a closed position. In some embodiments, the heat responsive actuator can be engageable with the closure of the container to retain the closure in the closed position and the projection member in the retracted position such that the fire suppressant material can be retained within the container. The heat responsive actuator can then be actuated by a fire on the stovetop to release the closure, the projection member, and the fire suppressant material. In still other embodiments, the fire can be located on a second burner of the stovetop, and the heat responsive actuator can be positionable to be actuated by the fire on the second burner when the container is mounted to the microwave.

One objective of the present disclosure is to extinguish fires that occur on stovetops before the fire spreads to nearby structures.

Another objective of the present disclosure is to help reduce the visibility of fire extinguishing devices positioned below microwaves and reduce the encroachment of such devices in the cooking space of the user.

Another objective is to help increase the aesthetic appearance of a kitchen unit including a stove, a microwave, and a fire extinguishing device.

Another objective is to extinguish fires on both a front and back burner of the stovetop.

Numerous other objects, advantages and features of the present disclosure will be readily apparent to those of skill in the art upon a review of the following drawings and description of a preferred embodiment.

DETAILED DESCRIPTION

Figure 1:
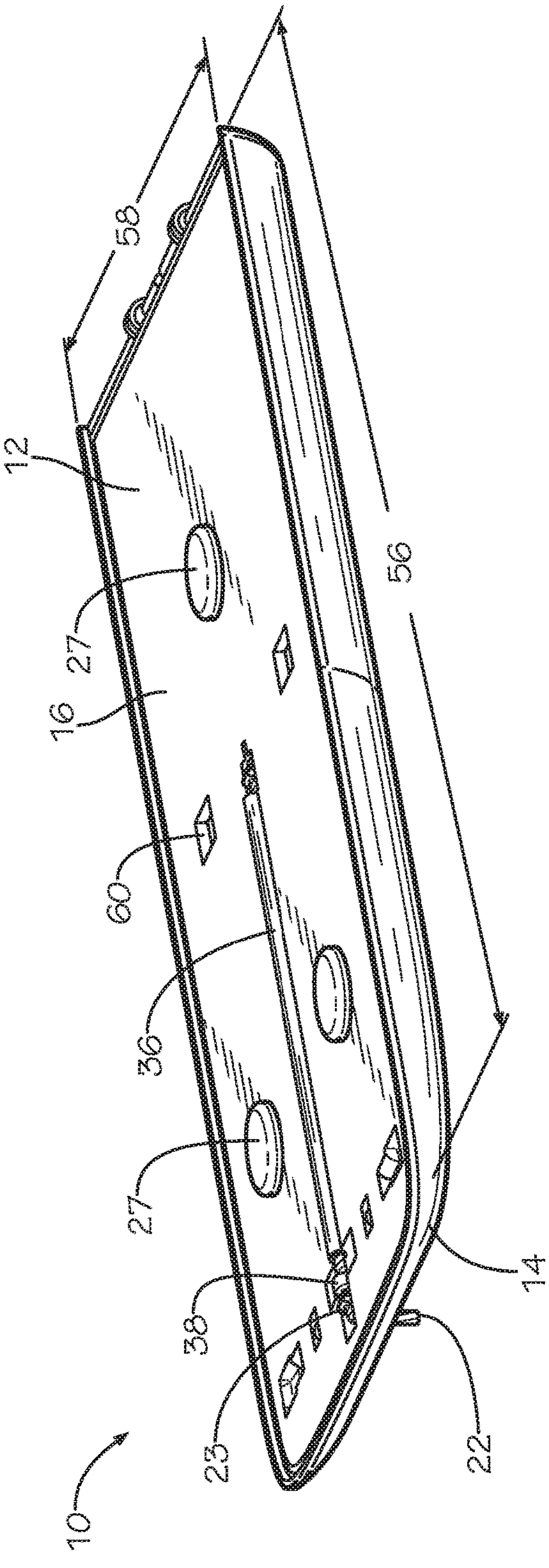
FIG. 1 is a perspective view of an embodiment of a fire extinguishing apparatus of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as “upper,” “lower,” “side,” “top,” “bottom,” etc. refer to the apparatus when in the orientation shown in the drawing. A person of skill in the art will recognize that the apparatus can assume different orientations when in use.

Figure 2:
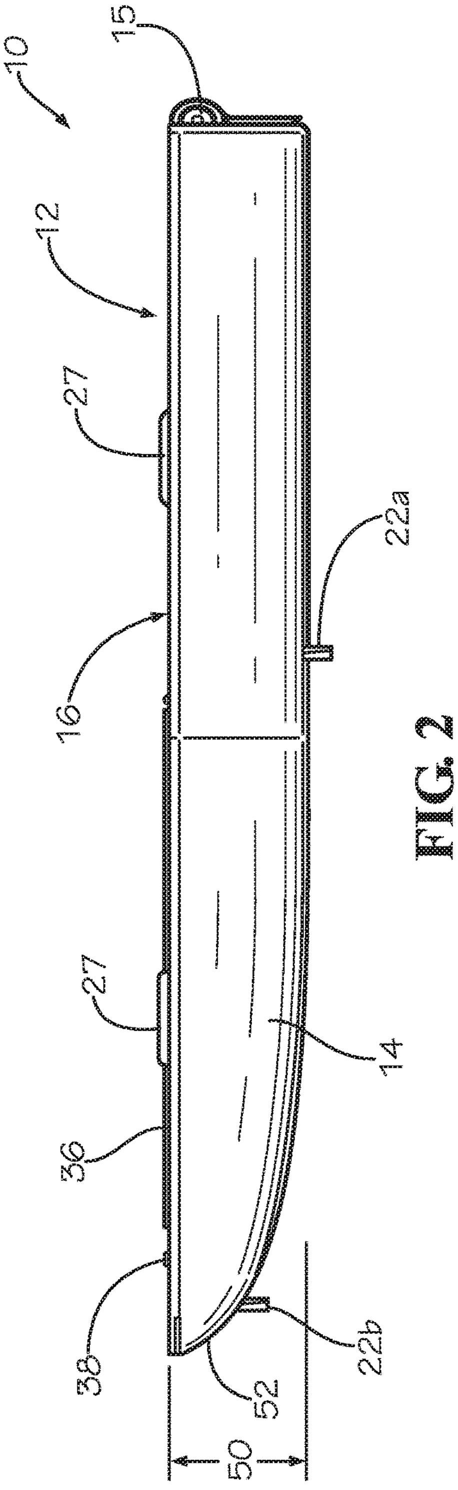
FIG. 2 is a side view of the apparatus of FIG. 1.
Figure 3:
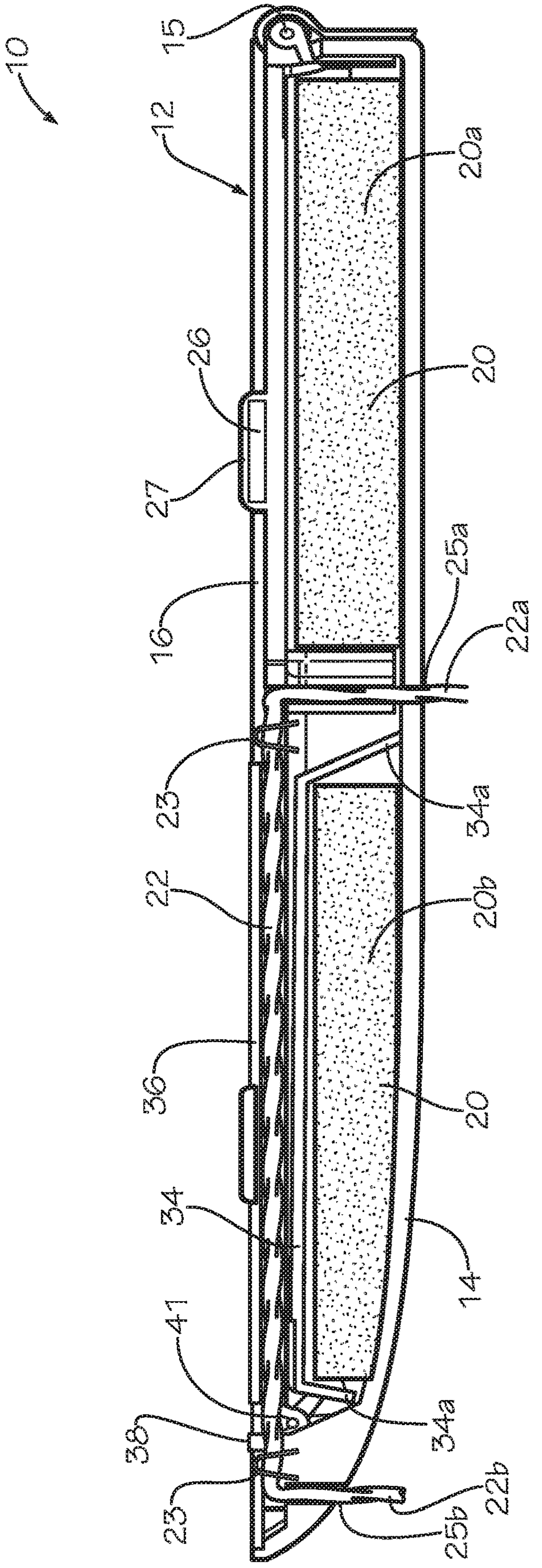
FIG. 3 is a cross sectional view of the apparatus of FIG. 2.
Figure 8:
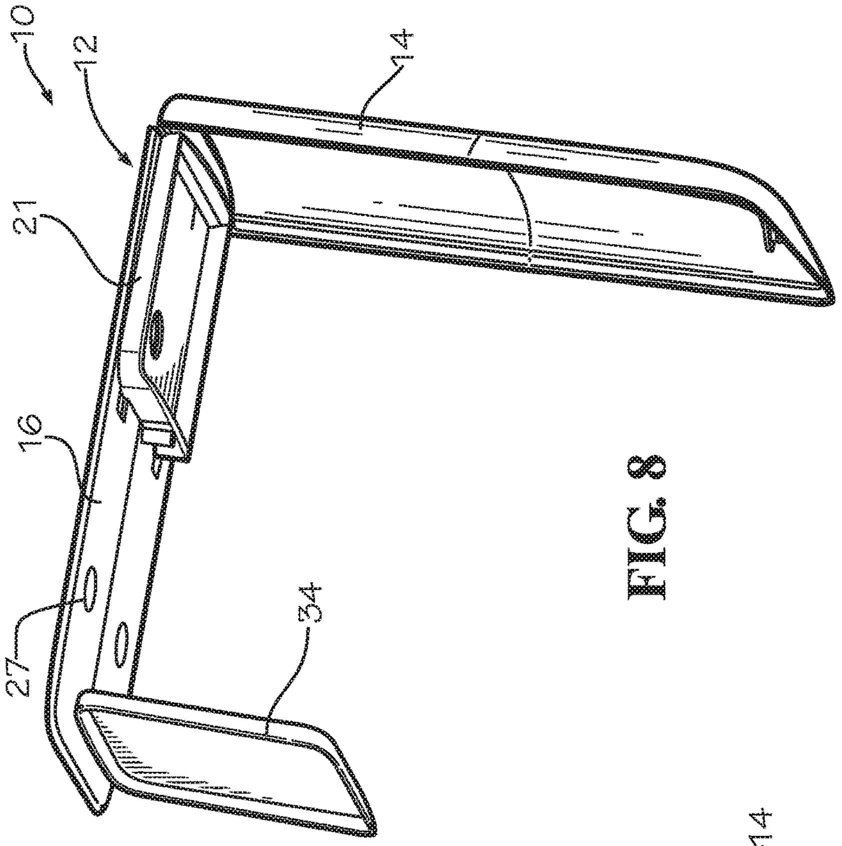
FIG. 8 is a perspective view of the apparatus of FIG. 7 with a projection member in an extended position.

An embodiment of an apparatus 10 for extinguishing a fire on a stovetop having a first burner and a second burner and a microwave positioned over the stovetop is shown in FIGS. 1-4. The apparatus 10 can include a container 12 which can be detachably mountable to a microwave positioned above a stovetop in a kitchen. The container 12 can have a closure 14 movable between an open position and a closed position. In some embodiments, the container 12 can have a frame or base 16, the closure 14 pivotally connected to the frame 16. In some embodiments, the frame 16 and the closure 14 can be connected via a living hinge. In other embodiments, the closure 14 can be mechanically connected to frame 16 via one or more closure axles 15. The closure 14 is shown in FIGS. 1-3 in a closed position. The closure 14 is shown in an open position in FIGS. 7-8. In some embodiments, the closure 14 can be biased toward an open position, for instance via closure torsion springs 17, shown in FIG. 4, coupled between closure 14 and frame 16. As the closure 14 moves to the closed position, the closure torsion springs 17 can be placed either in tension or compression to bias the closure 14 back toward the open position.

Figure 4:
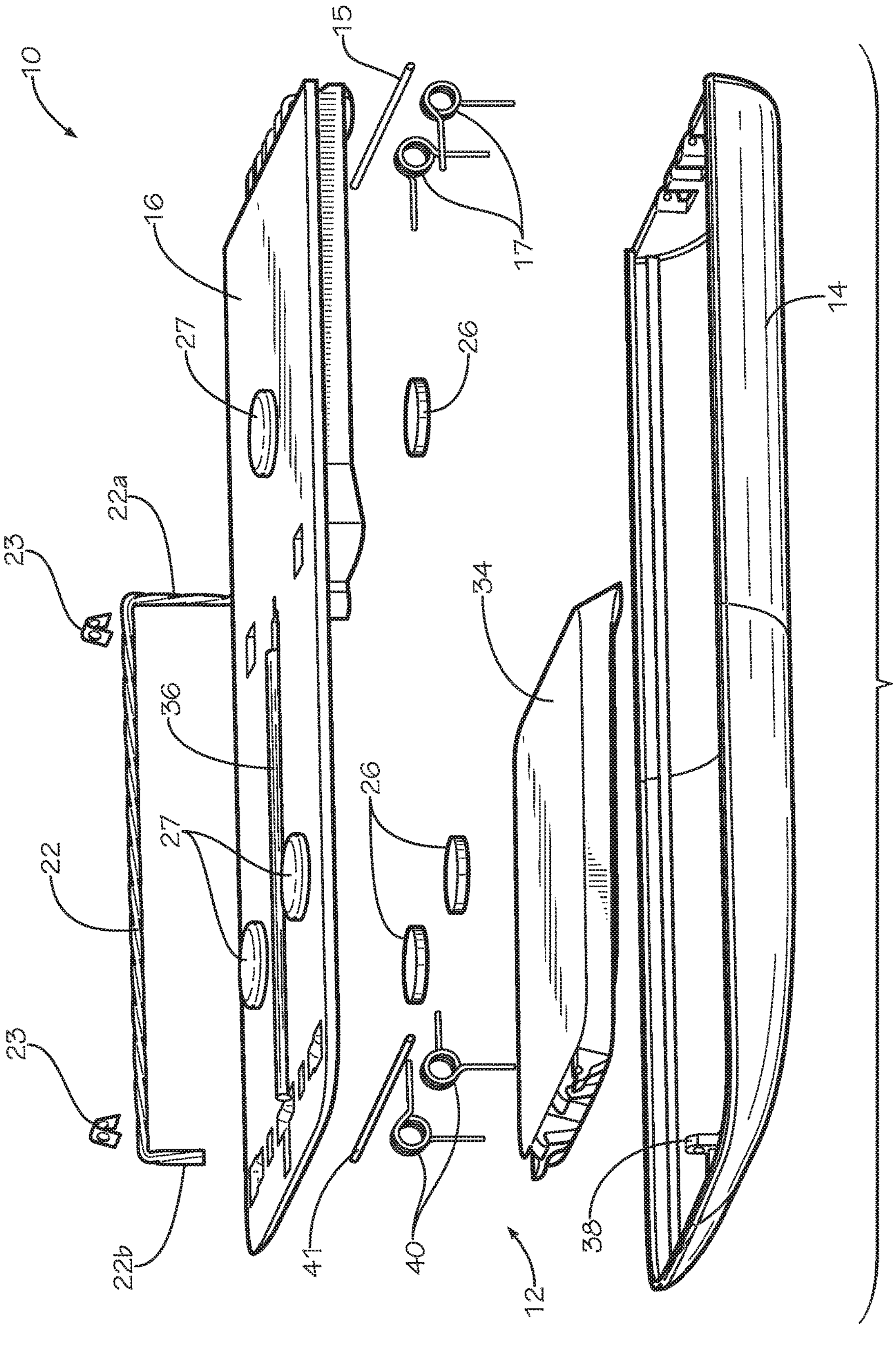
FIG. 4 is an exploded view of the apparatus of FIG. 1.
Figure 9:
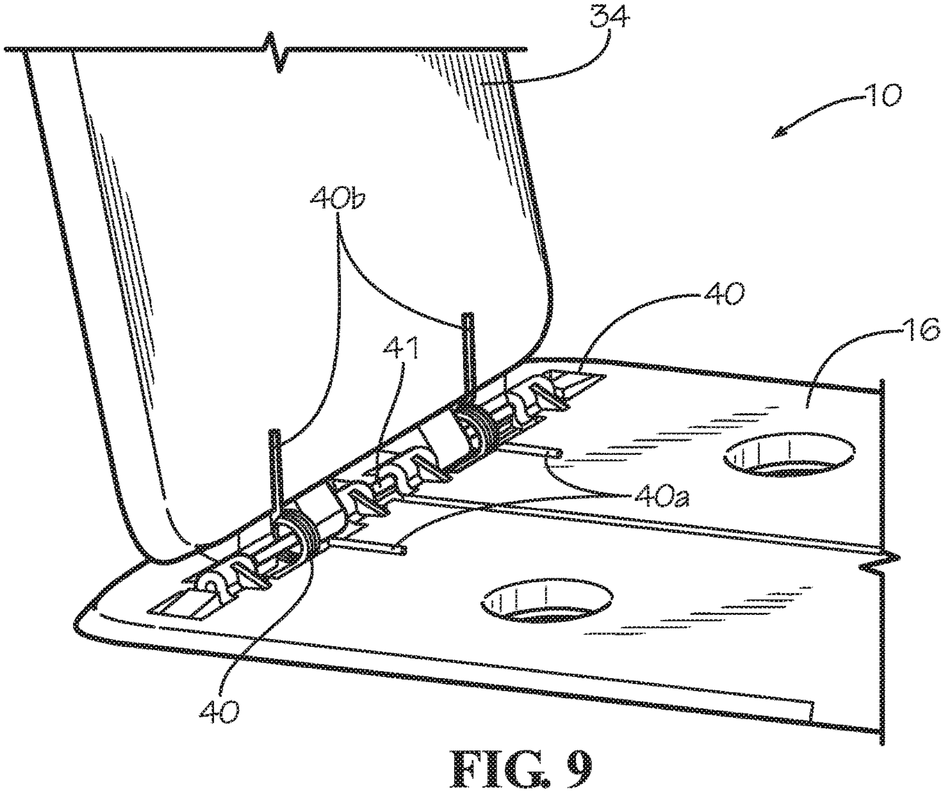
FIG. 9 is a detailed perspective view of the projection member of FIG. 8 shown biased by one or more torsion springs in an extended position.

Referring again to FIGS. 1-4, the apparatus 10 can include a projection member 34 connected to the container 12. The projection member 34 can be movable between a retracted position and an extended position. The projection member 34 is shown in a retracted position in FIG. 3, and the projection member 34 is shown in an extended position in FIG. 8. The projection member 34 can be pivotally connected to the frame 16 in some embodiments such that the projection member 34 can rotate between the retracted position and the extended position. Referring to FIGS. 4 and 9, in some embodiments the projection member 34 can be pivotally connected to the frame 16 via projection member axle 41. In some embodiments, when the apparatus 10 is mounted to a microwave, the projection member 34 can be pivotally connected to a front end of the frame 16 such that as the projection member 34 moves to the extended position, the projection member 34 can extend toward the front of the frame 16 and the apparatus 10. In some embodiments, when the projection member 34 moves to the extended position, the projection member 34 can extend past the front of the frame 16. In other embodiments, projection member 34 can move linearly between a retracted position and an extended position, for instance via a linear spring.

In some embodiments, as shown in FIGS. 4 and 9, the projection member 34 can be biased toward the extended position. In some embodiments, one or more projection member torsion springs 40 can be coupled between the projection member 34 and the frame 16. Projection member torsion springs 40 can have a first arm **40*a* engaging the frame 16 and a second arm 40*b* engaging the projection member 34, the arms 40*a* and 40*b* biasing the projection member 34 in the extended position. As the projection member 34 moves to the retracted position, the projection member torsion springs 40 can be placed in either tension or compression to bias the projection member 34 toward the extended position. As such, when the closure 14 moves to the open position, the projection member torsion springs 40 can forcibly move the projection member 34 to the extended position. When the projection member 34 is in the retracted position and the closure 14 is in the closed position, the projection member torsion springs 40 can also cause the projection member 34 to apply a force on the closure 14 which can also bias the closure 14** toward the open position.

The apparatus 10 can include a supply of fire suppressant material 20 retainable within the container 12 when the projection member 34 is in the retracted position and the closure 14 is in the closed position, as shown in FIG. 3. In some embodiments, the fire suppressant material 20 can be in powdered form, and can include a variety of chemicals or compounds for suppressing a fire, including but not limited to sodium bicarbonate (baking soda), ammonium polyphosphate, potassium bicarbonate, potassium chloride, or any other suitable fire suppressant powder or dry chemical.

In some embodiments, as seen in FIGS. 3, the frame 16 can include a fire suppressant material reservoir 21 positioned adjacent the projection member 34 when the projection member 34 is in the retracted position. When the closure 14 is in the closed position and the projection member 34 is in the retracted position, a first burner portion **20*a* of the supply of fire suppressant material can be retained in the fire suppressant material reservoir 21, and a second burner portion 20*b* of the supply of fire suppressant material 20 can be retained in the projection member 34**.

Figure 14:
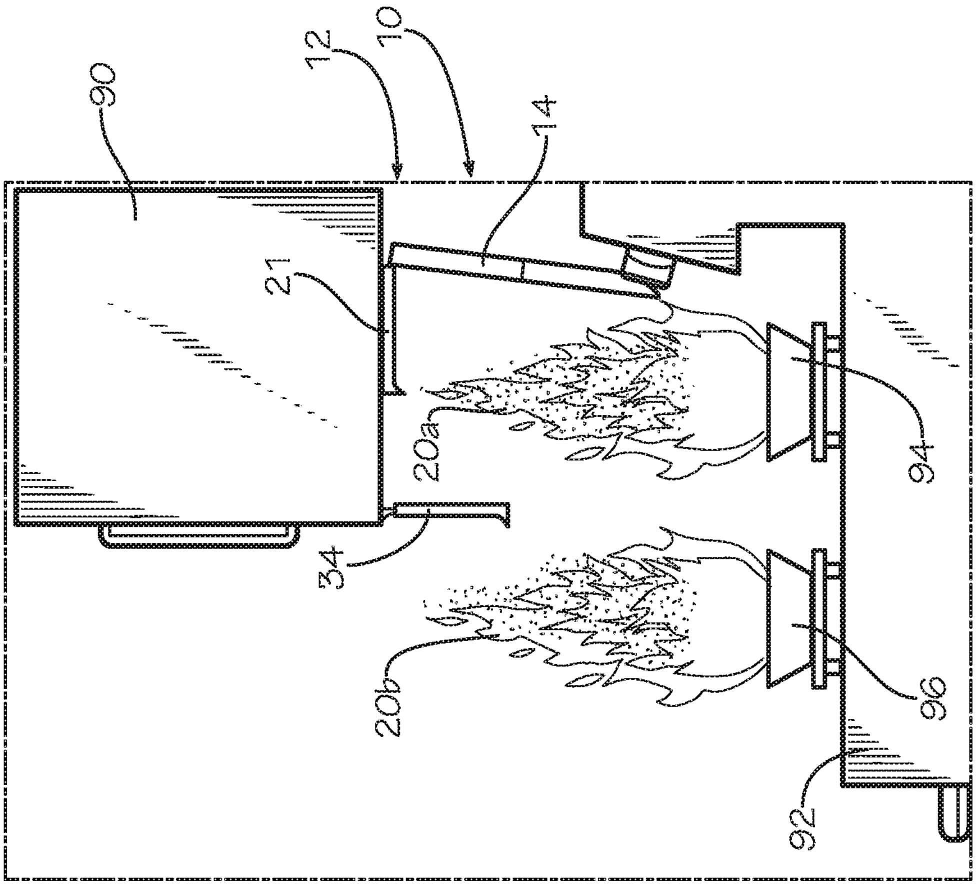
FIG. 14 is a side view of the apparatus of FIG. 13 shown actuated by the fire on the stove top, the apparatus dropping powder on multiple fires on the stovetop.
Figure 13:
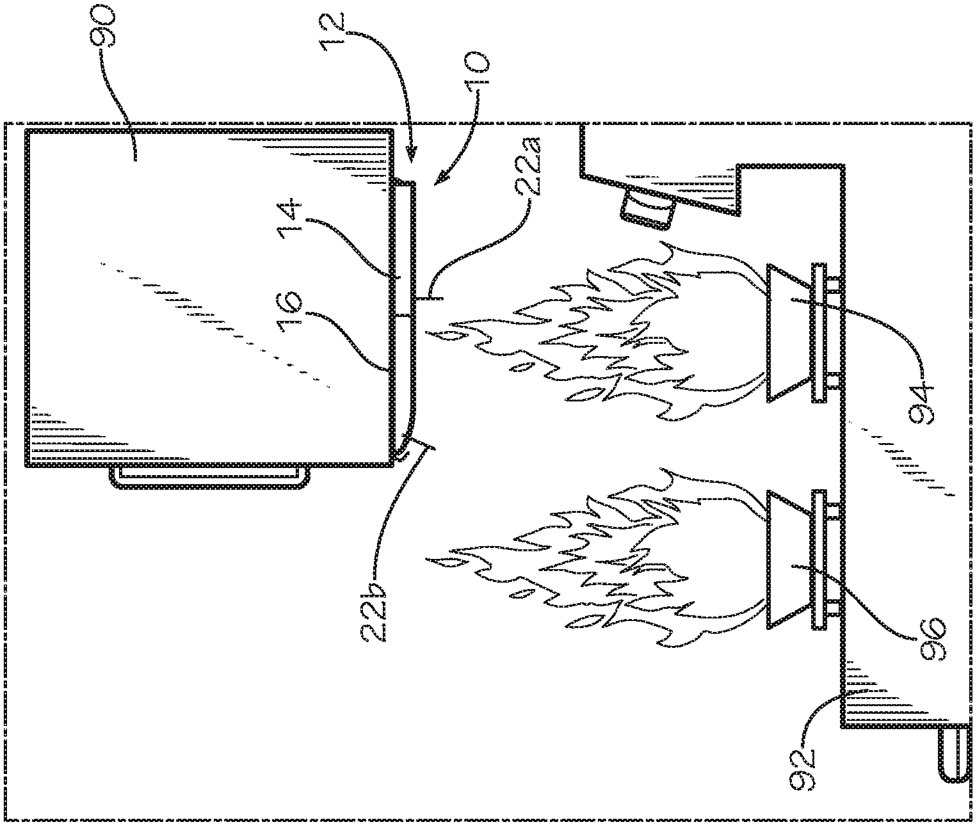
FIG. 13 is a side view of the apparatus of FIG. 12 shown positioned above multiple fires on the stovetop.
Figure 15:
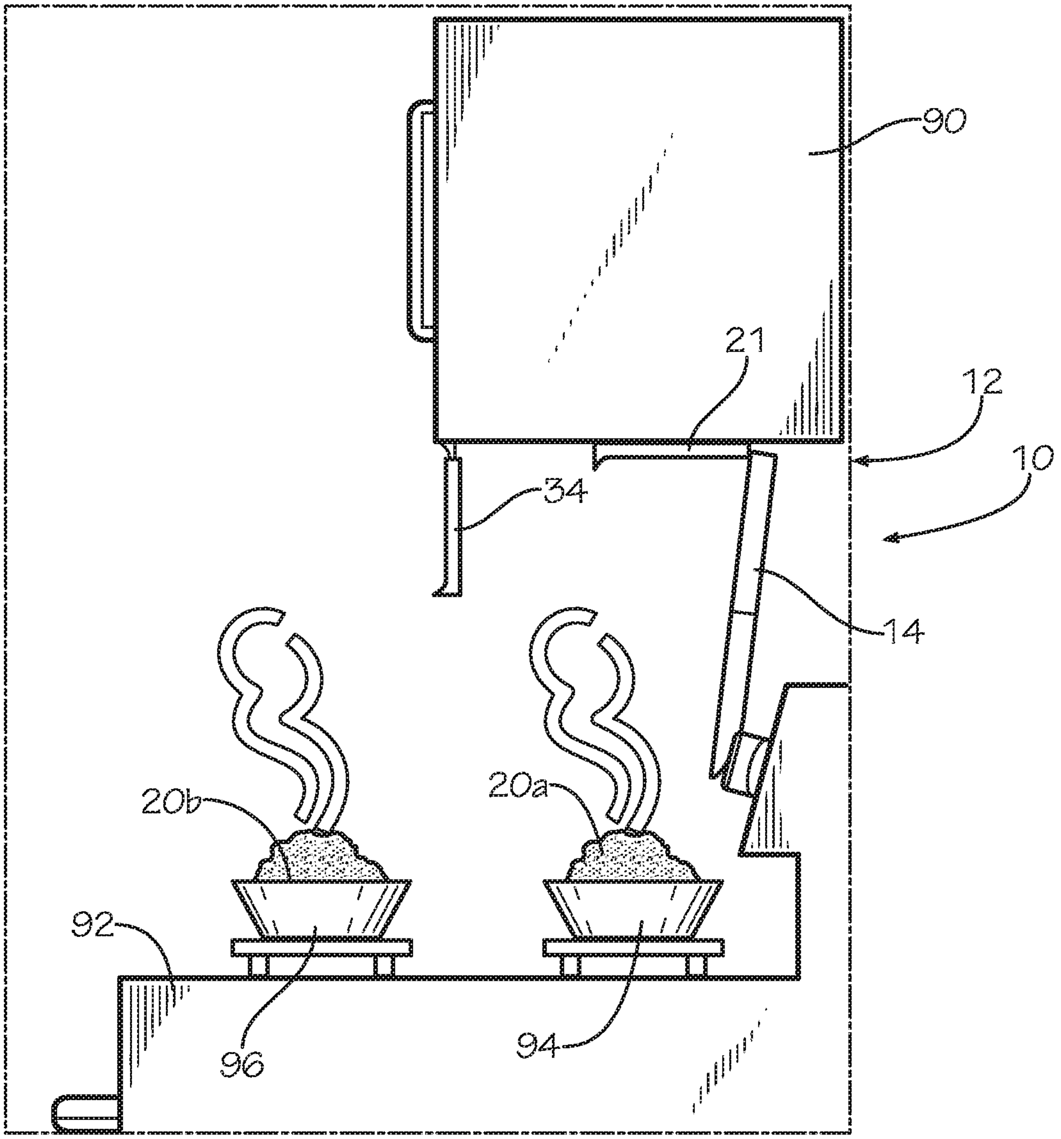
FIG. 15 is a side perspective view of the apparatus of FIG. 14 with the fires on the stovetop extinguished.

A heat responsive actuator 22 can be disposed on the container 12. The heat responsive actuator 22 can respond to or be actuated by a fire on a stovetop when the apparatus 10 is mounted to a microwave positioned above the stovetop. As shown in FIGS. 13-15, when the supply of fire suppressant material 20 is retained within the container 12, the container 12 is mounted to a microwave 90 over a first burner 94, and a fire on the stovetop 92 actuates the heat responsive actuator 22, the closure 14 can move to the open position and the projection member 34 can move to the extended position, as shown in FIG. 14, the projection member 34 forcing a second burner portion **20*b* of the fire suppressant material 20 towards a second burner 96 on the stovetop 92. In some embodiments, the first burner portion 20*a* of the supply of fire suppressant material 20 can fall from the fire suppressant material reservoir 21 onto the first burner 94 of the stovetop 92. As such, the apparatus 10 when actuated can cause fire suppressant material to fall on both a first and second burner 94 and 96, or a front and back burner, of a stovetop 92**.

One benefit of having an apparatus 10 with a projection member 34 that moves from a retracted position to an extended position upon actuation of the apparatus 10 is that a portion of the fire suppressant material 20 can be projected by the projection member 34 toward burners not directly beneath the apparatus 10. As such, the device 10 can be positioned over a first burner 94 and generally adjacent to a second burner 96, and the apparatus 10 when actuated can drop a first portion of the fire suppressant material **20*a* onto a first burner 94, and project or sling a second portion of the fire suppressant material 20*b* toward the second burner 96**.

In some embodiments, the second burner 96 can be a second front burner positioned beyond or outward from a front end of the microwave 90, and the first burner 94 can be a first back burner positioned beneath the microwave 90. As such, the apparatus 10 can be positioned under the microwave 90 over a first back burner 94, and when the heat responsive actuator 22 is actuated, the projection member 34 is capable of projecting fire suppressant material 20 towards the second front burner 96 while the apparatus 10 prior to actuation can be positioned and mounted rearward of the front edge of the microwave 90, which can help reduce the visual and physical footprint of the apparatus 10.

Figure 10:
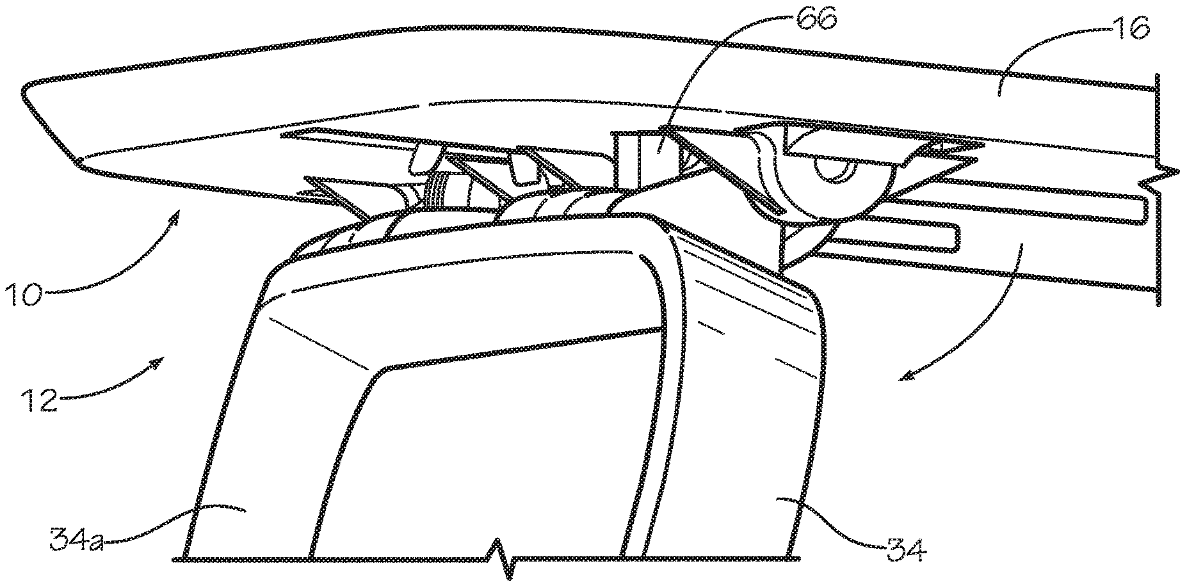
FIG. 10 is a detailed perspective view of another embodiment of a fire extinguishing apparatus including an angular stop positioned to stop a projection member as the projection member moves from a retracted position to an extended position.

In some embodiments, as shown in FIG. 10, the frame 16 can include an angular stop 66 extending downward from the frame 16 when the container 12 is mounted to a microwave. The angular stop 66 can be positioned to stop the projection member 34 as the projection member 34 rotates to the extended position. As such, the angular stop 66 can be oriented to stop the projection member 34 in a particular oriented such that a second burner portion of the fire suppressant material is forced in a desired direction when the projection member 34 hits the angular stop 66.

In some embodiments, the projection member 34 can be concave vessel pivotally connected to the container 12, as shown in FIG. 3. The second burner portion **20*b* of the supply of fire suppressant material 20 can be positioned within the concave vessel 34 prior to actuation of the heat responsive actuator 22. The concave vessel 34 can have one or more sidewalls 34*a*, such that as the concave vessel 34 rotates from the retracted position to the extended position, the sidewalls 34*a*** can help retain the second burner portion 20*b* of the fire suppressant material 20 within the concave vessel 34 until the concave vessel 34 reaches a final extended position.

In some embodiments, as shown in FIG. 3, the heat responsive actuator 22 can be a passive actuator which can be engageable with the closure 14 to retain the closure 14 in the closed position prior to actuation, which can also retain the projection member 34 in a retracted position prior to actuation. When the heat responsive actuator 22 is exposed to or actuated by a fire on a stovetop, the heat responsive actuator 22 can burn, melt, or otherwise be consumed by the fire to release the closure 14 such that the closure 14 can move to the open position and the projection member 34 can move to the extended position.

Figure 5:
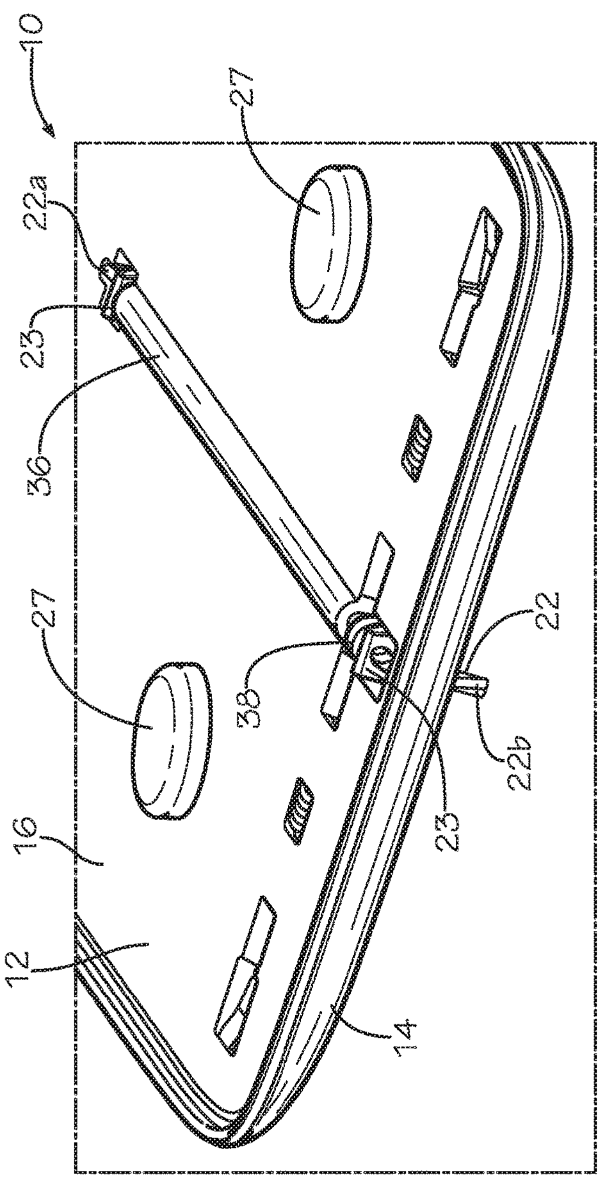
FIG. 5 is a detailed view of a heat responsive actuator of the apparatus of FIG. 1 securing a closure in a closed position.
Figure 6:
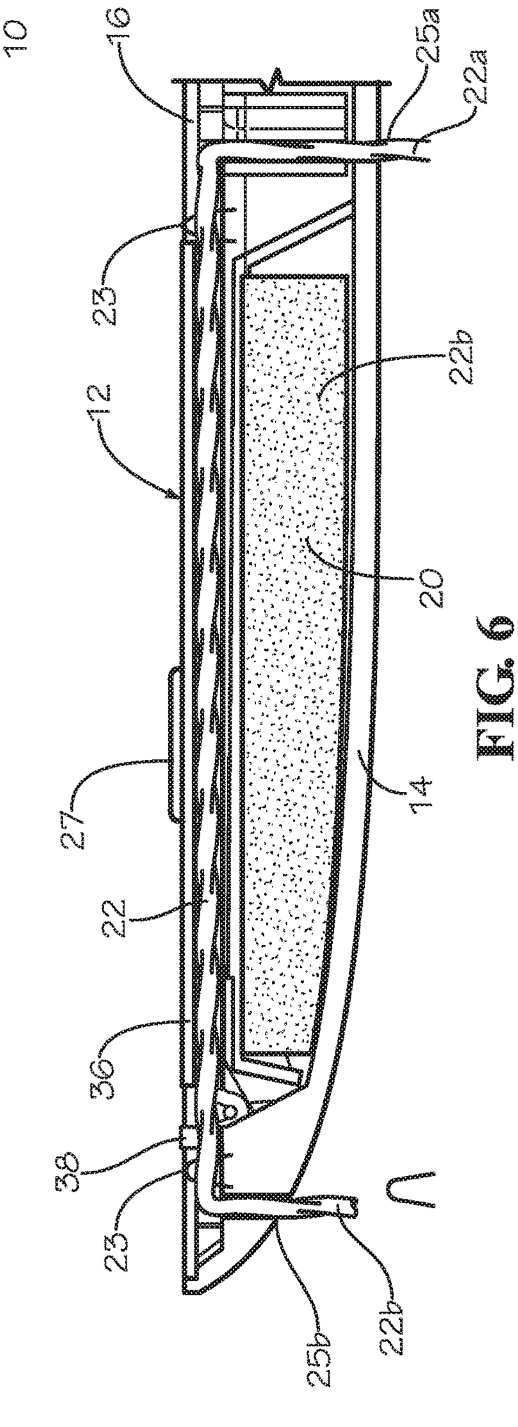
FIG. 6 is a cross sectional view of the heat responsive actuator of FIG. 5.

As can be seen in FIGS. 5-6, in some embodiments, the heat responsive actuator 22 can be a fuse wire which can ignite and burn or otherwise be consumed when exposed to a fire on a stovetop. The frame 16 in some embodiments can include a frame actuator receptacle 36 and the closure 14 can include a closure actuator receptacle 38. The fuse wire 22 can extend through and be retained within both the frame actuator receptacle 36 and the closure actuator receptacle 38 to retain the closure 14 in the closed position with respect to the frame 16. In some embodiments, the fuse wire 22 can be knotted on one or both ends to retain the fuse wire 22 within the frame actuator receptacle 36 and the closure actuator receptacle 38 to retain the closure 14 in the closed position. In still other embodiments, as shown in FIG. 5, the heat responsive actuator 22 can further include one or more retention clips 23 which can be clipped onto the fuse wire 22 to retain the fuse wire 22 within the frame actuator receptacle 36 and the closure actuator receptacle 38 to retain the closure 14 in the closed position.

The retention clips 23 in FIGS. 5-6 are shown as spring clips which can be contracted such that the spring clips 23 can slide on the fuse wire 22 to a desired position, the spring clips 23 subsequently released and expanded when the clips are in a desired position on the fuse wire to engage the fuse wire such that the fuse wire is retained within the frame actuator receptacle 36 and the closure actuator receptacle 38 to retain the closure 14 in the closed position. A first spring clip 23 is shown in FIG. 5 positioned adjacent a first end of the frame actuator receptacle 36 and outward from the closure actuator receptacle 38, and a second spring clip 23 is shown adjacent a second end of the frame actuator receptacle 36 such that the first and second clips 23 when engaging the fuse wire 34 can retain the fuse wire 34 within the frame actuator receptacle 36 and the closure actuator receptacle 38 to retain the closure 14 in the closed position.

In some embodiments, as shown in FIG. 6 and FIG. 13, the heat responsive actuator 22 can extend from one or more locations or holes in the closure 14. In some embodiments, the heat responsive actuator 22 can include a first actuator portion 22*a* extending from a first location 25*a* on the closure 14, and a second actuator portion 22*b* extending from a second location 25*b* on the closure 14. In some embodiments, the heat responsive actuator 22 can be a single fuse wire 22 having a first end 22*a* extending out from a first location 25*a* on the closure 14 and a second end 22*b* extending out of a second location on the closure 14. When the apparatus 10 is mounted on a microwave 90 above a stovetop 92 having a first burner 94 and second burner 96, the first end or portion 22*a* of the heat responsive actuator 22 can generally be positioned to respond to a fire on the first burner 94, and the second end or portion 22*b* of the heat responsive actuator 22 can generally be positioned to respond to a fire on the second burner 96. As such, heat responsive actuator 22 can respond to or be actuated by a fire on either a first or second burner 94 or 96 of a stovetop 92 when the apparatus 10 is mounted on a microwave 90 above the stovetop 92. In FIG. 6, if the heat responsive actuator 22 is lit at either end, the heat responsive actuator 22 can be consumed to release the closure actuator receptacle 38 from the frame actuator receptacle 36, thereby allowing the closure 14 to move to the open position.

The apparatus 10 of FIGS. 1-8 is shown as having a single closure 14 which can move to an open position when either a first portion 22*a* or a second portion 22*b* of the heat responsive actuator 22 is actuated by a fire on either a first burner or a second burner of a stovetop when the apparatus 10 is mounted on a microwave above the stovetop. In other embodiments, the apparatus 10 can include multiple closures movable between an open and a closed position with respect to the frame 16. The first burner portion 20*a* of the supply of fire suppressant material can be retainable within the container 12 by a first closure, and the second burner portion 20*b* of the supply of fire suppressant material can be retainable within the container 12 by the second closure, the second closure also retaining the projection member 34 in the retracted position when the second closure is in the closed position. Independent heat responsive actuators can be positioned on the container 12. When the apparatus 10 is mounted on a microwave above a first burner of a stovetop, a first heat responsive actuator can be positioned to respond to a fire on a first burner of the stovetop, and a second heat responsive actuator can be positioned to respond to a fire on a second burner of the stovetop. The first closure can move to an open position to release the first burner portion 20*a* of the fire suppressant material when the first actuator responds to a fire on the first burner, and the second closure can move to an open position to release the projection member 34 and the second burner portion 20*b* of the fire suppressant material 20 so that the projection member 34 can force the second burner portion 20*b* of the fire suppressant material 20 towards a second burner on the stovetop. As such, in some embodiments, first and second burner portions 20*a* and 20*b* of fire suppressant material 20 can be released independently of one another, each portion being released when a fire breaks out on a corresponding burner on a stovetop.

While the apparatus 10 shown in FIGS. 5-6 includes a frame actuator receptacle 36 and a closure actuator receptacle 38 in which the heat responsive actuator 22 is retained to retain the closure 14 in the closed position, a heat responsive actuator 22 can be oriented in a number of configurations to effectively retain the closure 14 in the closed position. For instance, in some embodiments, the heat responsive actuator 22 can be tied around the exterior of the closure 14 and the frame 16 to retain the closure 14 in the closed position. When the heat responsive actuator ignites, the closure 14 is subsequently released and can move to an open position. Additionally, while the frame actuator receptacle 36 and the closure actuator receptacle 38 are shown in FIGS. 5-6 as flanges or tubes disposed on the frame 16 and closure 14 respectively, in other embodiments the frame actuator receptacle 36 and the closure actuator receptacle 38 can simply be holes formed in the frame 16 and closure 14 respectively, the holes receiving the heat responsive actuator 22.

In some embodiments, the heat responsive actuator 22 can include a visco fuse wire having a core of black powder with one or more textile wraps. The black powder readily ignites when exposed to a flame. In other embodiments, the heat responsive actuator can include a solder wire made of tin, zinc, or other alloys with a relatively low melting point of less than about 350 degrees. In such embodiments, when the solder wire is exposed to a flame or fire on the stovetop, the solder wire can melt and break to release the closure 14. In still other embodiments, the heat responsive actuator can be a solder joint connecting the closure 14 and the frame 16 together with the closure 14 in the closed position. In some embodiments, the solder joint can be positioned on a front end of the apparatus 10 when the apparatus is mounted on a microwave, such that the solder joint can be positioned generally between a first and second burner on a stovetop beneath the microwave. As such, the solder joint can generally be exposed to or actuated by a fire on either the first or second burner of the stovetop. The solder joint can melt when exposed to a fire on the stovetop, thereby releasing the closure 14 so the closure 14 can move to the open position. As discussed above, having the projection member 34 biased toward an extended position and the closure 14 biased toward an open position can help provide a breaking force on a solder wire or solder joint retaining the closure 14 in a closed position, the biasing of the closure 14 and the projection member 34 encouraging the solder joint or solder wire to break as the solder joint or solder wire is exposed to a flame on the stovetop and begins to melt.

Figure 11:
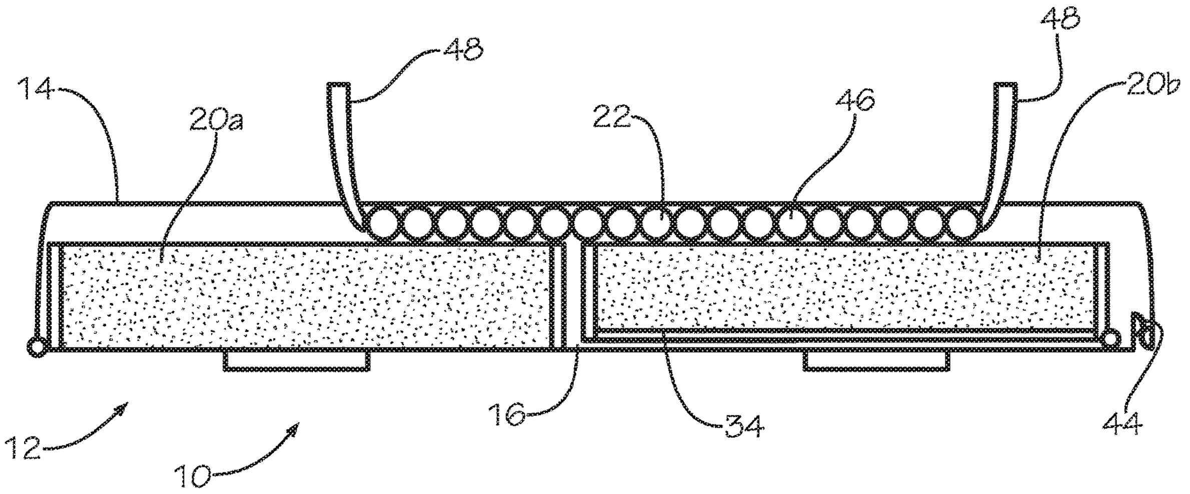
FIG. 11 is a cross sectional view of another embodiment of an apparatus for extinguishing a fire on a stovetop having a heat responsive actuator including an explosive element.

In other embodiments, as shown in FIG. 11, the closure 14 can be retained in the closed position via any suitable releasable fastener 44, including a snap fit member, clasp, snap button, hook and loop fastener, or other suitable fastener 44 for releasably retaining the closure 14 in the closed position. In some embodiments, the heat responsive actuator when actuated can forcibly cause the closure 14 to move to the open position, for instance via an explosive or incendiary element which can forcibly overcome the releasable fastener 44 and move the closure 14 to an open position. The heat responsive actuator 22 can include an explosive element 46 positioned within the container 12 and against the closure 14 in some embodiments, with one or more fuses 48 for the explosive element 46 extending out of a hole in the closure 14. When the fuse 48 is lit by a fire on a stovetop, the fuse ignites the explosive element, thereby forcing the closure 14 open to release the projection member 34. In some embodiments, multiple explosive elements 46 can be positioned in the container 12. Each explosive element can be oriented to respond to or be actuated by a corresponding burner on the stovetop.

Referring to FIG. 4, the device 10 can also include a mounting member 26 disposed on the container 12 opposite the closure 14. The mounting member 26 can detachably mount or secure the apparatus 10 and the container 12 to a microwave positioned above a stovetop. As such, when the apparatus 10 is mounted beneath a microwave 90, the closure 14 can be oriented such that the closure 14 faces the stovetop 92, the heat responsive actuator 22 extending from the apparatus 10, and in some embodiments from the closure 14, toward the stovetop 92, as shown in FIG. 13. In some embodiments, the apparatus 10 can include multiple mounting members 26 disposed on the container 12 to detachably mount or secure the container 12 to the microwave.

In FIG. 4, the mounting members 26 are shown as one or more magnets disposed on an inner side of the frame 16. The magnets 26 can be magnetically attracted to a lower metal surface of the microwave when the container 12 is positioned in proximity to the lower surface of the microwave such that the magnets 26 retain the container 12 and the device 10 beneath the microwave. The magnets 26 can also allow the apparatus 10 to be readily repositioned under the microwave in different locations as desired by the user. One potential advantage of the magnets 26 shown in FIG. 4 is that the magnets 26 can be positioned inside the container 12 and still be attracted to the microwave to detachably mount or secure the apparatus 10 to the microwave. As such, the container 12 can be positioned directly against the microwave which can help decrease the distance the device 10 extends downward into the user's cooking space. In some embodiments, the frame 16 can include one or more magnet receptacles 27, each magnet 26 receivable in a corresponding magnet receptacle 27. The magnet receptacles 27 can help remove the magnets 26 from the space within the container 12 generally occupied by the supply of fire suppressant powder to help increase the amount of powder retainable within the container 12. The magnet receptacles 27 can also help prevent the magnets 26 from interfering with the movement of the projection member 34.

In other embodiments, the mounting member can be any suitable detachable fastener for detachably securing the apparatus 10 to the microwave, including but not limited to, removable adhesive strips, hook and loop fasteners, removable mechanical fasteners that can engage the microwave, suction cups, etc. In some embodiments, the mounting member can be disposed on an exterior surface of the frame 16 such that the mounting member can contact or engage the microwave directly.

Figure 12:
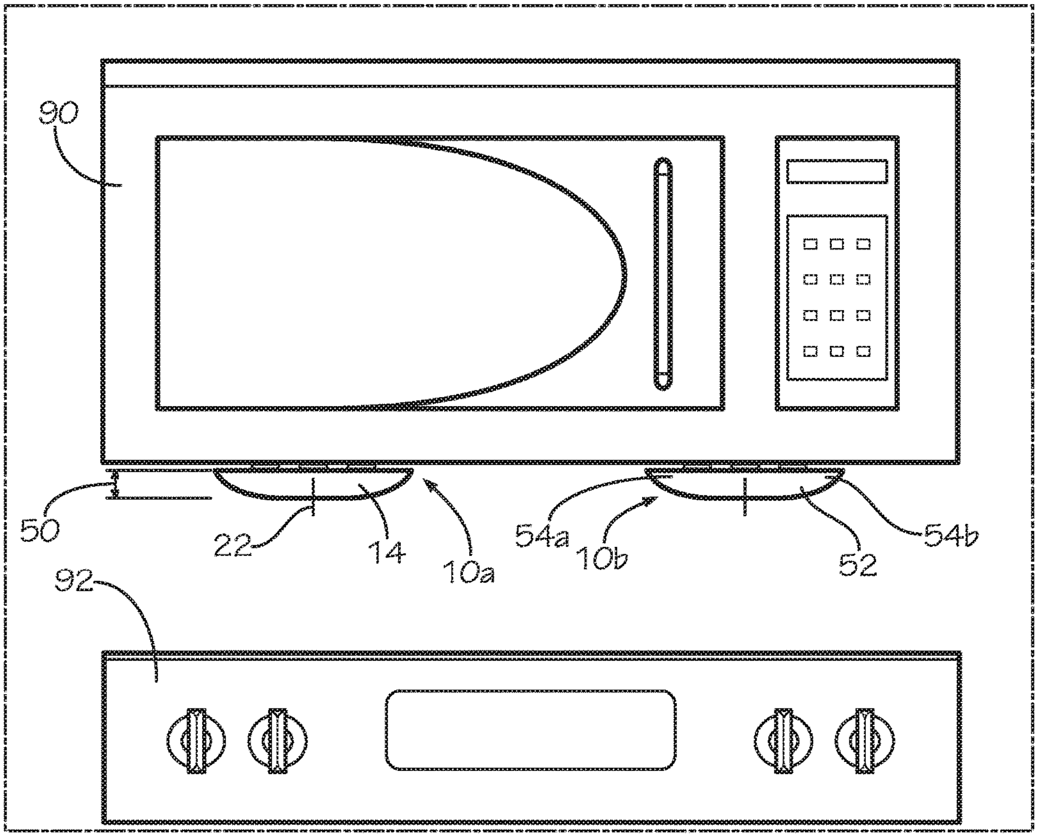
FIG. 12 a front view of the apparatus of FIG. 1 mounted on a microwave above a stovetop.

In some embodiments, the container 12 and closure 14 can have a relatively thin profile, height, or thickness 50 when the closure 14 is in the closed position and the apparatus 10 is detachably mounted under the microwave 90, as shown in FIG. 12. In some embodiments, the thickness 50 of the container 12 and the closure 14 can be less than about two inches. In some embodiments, the thickness 50 can be less than about one inch. In other words, when the apparatus 10 is detachably mounted to the microwave and the closure 14 is in the closed position, the container 12 can extend downward from the microwave 90 a distance of less than about 2 inches such that the height 50 of the container 12 is less than about 2 inches. In some embodiments, the thickness 50 of the container 12 can be less than about one inch. As such, when the apparatus 10 is positioned under the microwave 90, the small height 50 of the apparatus 10 can help reduce the visual footprint of the apparatus 10 when the apparatus 10 is positioned on the microwave 90 which can help produce a more aesthetically pleasing appearance for a kitchen unit containing the microwave 90 and the apparatus 10. This is especially true when the apparatus 10 is placed toward the back of the microwave 90 or over a back burner of the stovetop 92 as typically a user's eye line is above the bottom edge of the microwave 90. As such, if the device 10 is positioned on the back of the microwave 90, the device 10 may not be visible at all from an observer standing in front of the microwave 90. The thinness and smaller height of the apparatus 10 can also help reduce its vertical size when positioned beneath a microwave 90 and the intrusion of the apparatus 10 into the user's cooking space on the stovetop 92. Reducing the visual and physical impact of the apparatus 10 with respect to the kitchen unit, and thus the aesthetic appearance of the apparatus 10, can help encourage compliance and proper use of the fire extinguishing apparatus 10, as the negative impact of the fire extinguishing apparatus 10 on the aesthetic appearance and utility of the kitchen unit can be reduced.

Additionally, in some embodiments, when the apparatus 10 is mounted under a microwave 90 and the closure 14 is in the closed position, the closure 14 can have a rounded front end 52. In some embodiments, the closure 14 can also have a first rounded lateral side **54*a* and a second rounded lateral side 54*b*. Rounded front end 52 and rounded lateral sides 54***a* and 54*b* can curve inward with respect to the closure 14 as the rounded front end 52 and the rounded lateral sides 54*a* and 54*b* extend downward from the microwave 90 when the closure 14 is in the closed position. Rounded lateral sides 54*a* and 54*b* and a rounded front end 52 of the closure 14 can help give the apparatus 10 a sleek and aesthetically pleasing appearance when the apparatus 10 is positioned beneath the microwave 90, even if the microwave 90 does not fully block the view of the apparatus 10 from an observer standing in front of the microwave 90.

One issue with conventional fire extinguishing devices positioned below a microwave is that they are bulky, invade a user's cooking space, and can be generally unaesthetically pleasing. Many contractors will forego the use of conventional fire prevention devices to ensure the units they are building and selling/renting are aesthetically pleasing such that potential buyers will actually buy or rent the units. As such, the additional safety provided by such devices can be negated so the builder can ensure that the apartment units will be bought or rented. Having a fire extinguishing apparatus 10 with a thinner profile and smaller height 28 can help reduce the impact of the apparatus 10 and increase the aesthetic appearance and utility of the kitchen unit with the apparatus 10 in place. As such, builders and contractors can install fire extinguishing apparatus 10 in a kitchen unit while helping reduce the negative aesthetic impact of apparatus 10 when compared to conventional devices. The aesthetic features of the apparatus 10 can help increase compliance and encourage proper use of the apparatus 10 by builders as well as owners or renters of the apartments, condos, homes, etc., which can help increase the safety measures provided in a kitchen unit. Additionally, there can be significant cost savings associated with insurance premiums when stoves are equipped with fire prevention devices. As such, providing a more aesthetically appealing apparatus 10 which can encourage proper use of the apparatus 10 can help reduce some costs associated with building and maintaining the kitchen units from an insurance standpoint.

Additionally, in some embodiments, the container 12 can have an elongated length 30 such that the container 12 can hold an adequate supply of fire suppressant material 20 while retaining its smaller height and thickness 50, and generally thinner profile, as shown in FIG. 1. In some embodiments, the ratio of the length 56 to the width 58 of the container 12 can be greater than about 1.5. In some embodiments, the length 56 to width 58 ratio can be greater than about 2.

Figure 16:
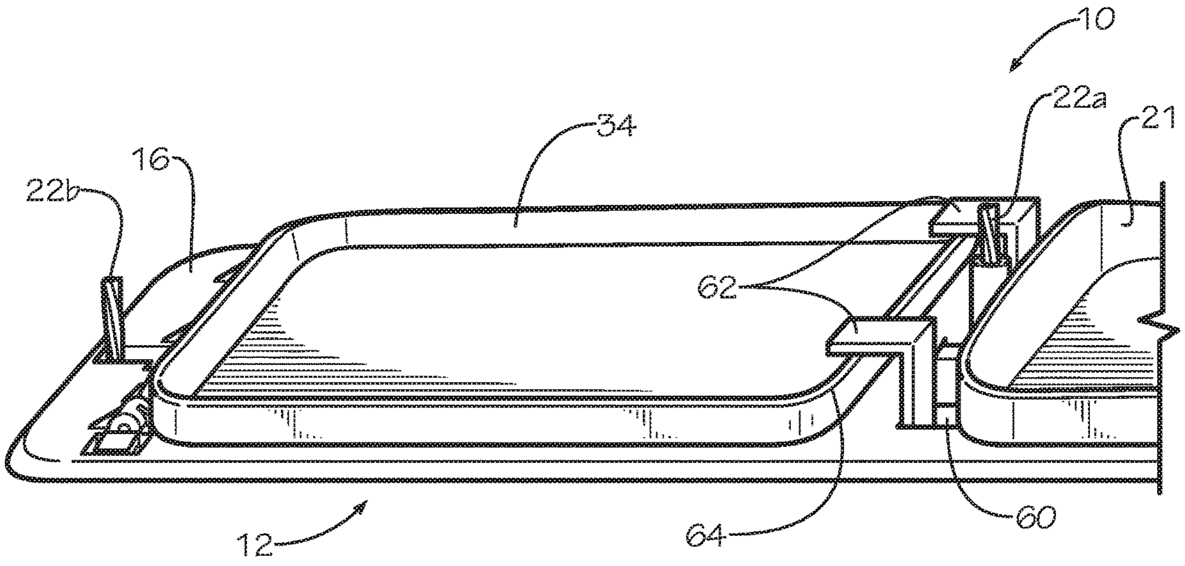
FIG. 16 is a detailed perspective view of the apparatus of FIG. 1 showing one or more retention apertures on a frame of a container of the apparatus, and one or more clips extending through the retention apertures to retain the projection member in the retracted position.
Figure 17:
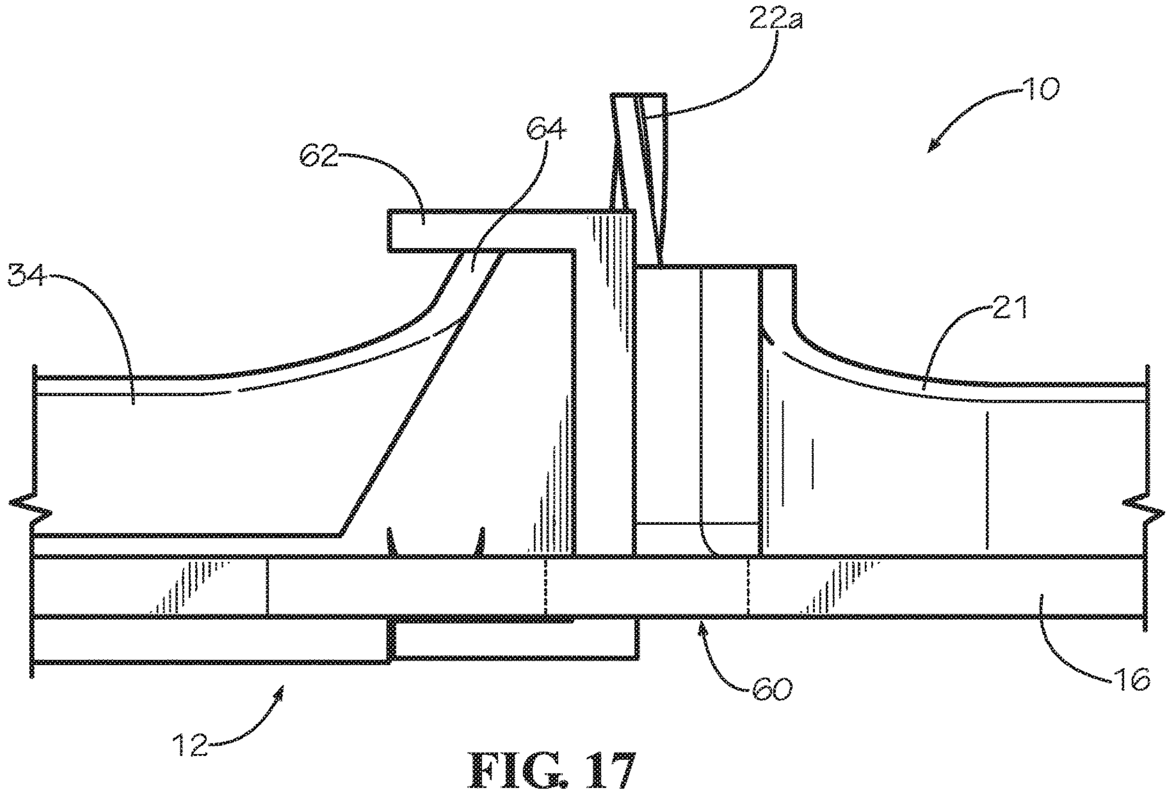
FIG. 17 is a side detailed view of the apparatus of FIG. 16.

Referring now to FIGS. 16 and 17, when apparatus 10 is being loaded or manufactured, projection member 34 can be placed in the retracted position. Fire suppressant material can then be placed in the projection member 34 and in the fire suppressant material reservoir 21. With the projection member 34 still in the retracted position, the closure can be moved to the closed position and can be retained either with a releasable fastener or with a heat responsive actuator to load or charge the apparatus 10 such that the apparatus 10 can be mounted under a microwave. When the projection member 34 is biased in the extended position and the closure is biased in the open position, it can be difficult to retain the projection member 34 in the retracted position while moving the closure to the closed position without spilling or losing any fire suppressant material positioned generally within the projection member 34 or the container 12.

In some embodiments, the frame 16 can include one or more retention apertures 60 defined in the frame 16. The retention apertures 60 can be positioned adjacent a distal end 64 of the projection member 34 when the projection member 34 is in the retracted position. In some embodiments, the retention apertures 60 can be positioned between the projection member 34 and the fire suppressant material reservoir 21 when the projection member 34 is in the retracted position. Retention apertures 60 can allow passage of projection member retention clips 62 through the retention apertures 60. Projection member retention clips 62 can be oriented to engage the frame 16 and the projection member 34 to retain the projection member 34 in the retracted position, as shown in FIGS. 16-17. The biasing of the projection member 34 toward the extended position can help maintain the engagement of the projection member retention clips 62 with the frame 16 and the projection member 34. With the projection member retention clips 62 engaged, the projection member 34 can be released by a user such that the closure 14 can be moved to the closed position without the interference of a user's hand. Once the closure 14 is secured in the closed position, either by a releasable fastener or by a heat responsive actuator 22, the projection member retention clips 62 can be removed, and the apparatus 10 can be loaded or charged and ready for installation on a microwave.

Projection member 34 is shown in FIG. 3 as extending across approximately half of frame 16 when the projection member 34 is in the retracted position. As such, the second burner portion 20*b* of the supply of fire suppressant material 20 can be contained on a first side of the frame 16 by projection member 34, and first burner portion 20*a* of the supply of fire suppressant material 20 can be contained in fire suppressant material reservoir 21 on a second side of the frame 16. In other embodiments, the projection member 34 when in the retracted position can extend across the entire frame 16 of the container 12, with the fire suppressant material reservoir positioned behind the projection member 34, or above the projection member 34 when the closure 14 is in the closed position and the container 12 is mounted to a microwave. As such, the second burner portion 20*b* of the fire suppressant material 20 can be positioned in the projection member 34, and the first burner portion 20*a* of the fire suppressant material 20 can be behind the projection member 34 when the projection member 34 is in the retracted position. In such embodiments, when the apparatus 10 is actuated, the closure 14 can move to the open position and the projection member 34 can move to the extended position to force the second burner portion 20*b* towards a second burner on a stovetop, the first burner portion 20*a* of the fire suppressant material falling from behind the projection member 34 onto a first burner of the stovetop as the projection member 34 moves to the extended position.

Typical stovetops include a four burner system spaced on the stovetop in a generally rectangular fashion, with two front burners and two back burners. In some applications, a first and second apparatus 10*a* and 10*b*, as shown in FIG. 12, can be positioned beneath the microwave 90. The first apparatus 10*a* can be positioned to suppress fires on a first or left pair of front and back burners on the stovetop 92, and the second apparatus 10*b* can be positioned to suppress fires on a second or right pair of front and back burners on the stovetop 92. As such, all four burners on the stovetop can be suppressed by either first apparatus 10*a* or second apparatus 10*b*.

Figure 7:
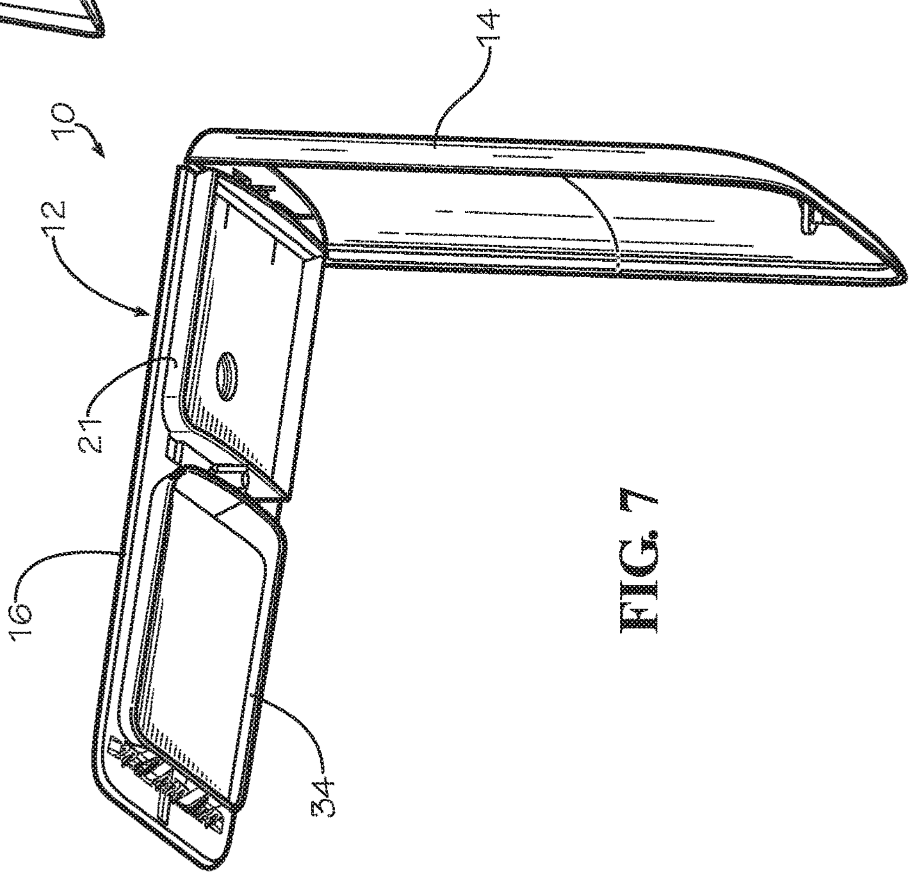
FIG. 7 is a perspective view of the apparatus of FIG. 1 with the closure in an open position.

Apparatus 10 is shown in FIGS. 3 and 7 as having a single projection member forcing a portion of the fire suppressant material towards a second burner on a stovetop when the apparatus is positioned over a first burner of the stovetop. In some embodiments, apparatus 10 can include a second projection member and a third projection member connected to the frame of the container. When the heat responsive actuator responds to a fire on the stovetop and the closure moves from the closed position to the open position, the projection member 34 can force a second burner portion of the fire suppressant material 20 towards a second burner on a stovetop, the second projection member can force a third burner portion of the fire suppressant material 20 towards a third burner on the stovetop, and the third projection member can force a fourth portion of the fire suppressant material 20 towards a fourth burner on the stovetop. As such, a single apparatus 10 can be positioned under a microwave and when actuated can project, force, or drop fire suppressant material 20 on all four burners of a stovetop. Different types of heat responsive actuators as discussed above can be used to actuate the various projection members either simultaneously in response to a fire on any of the burners, or independently depending on where a fire is located on the stovetop.

Figure 18:
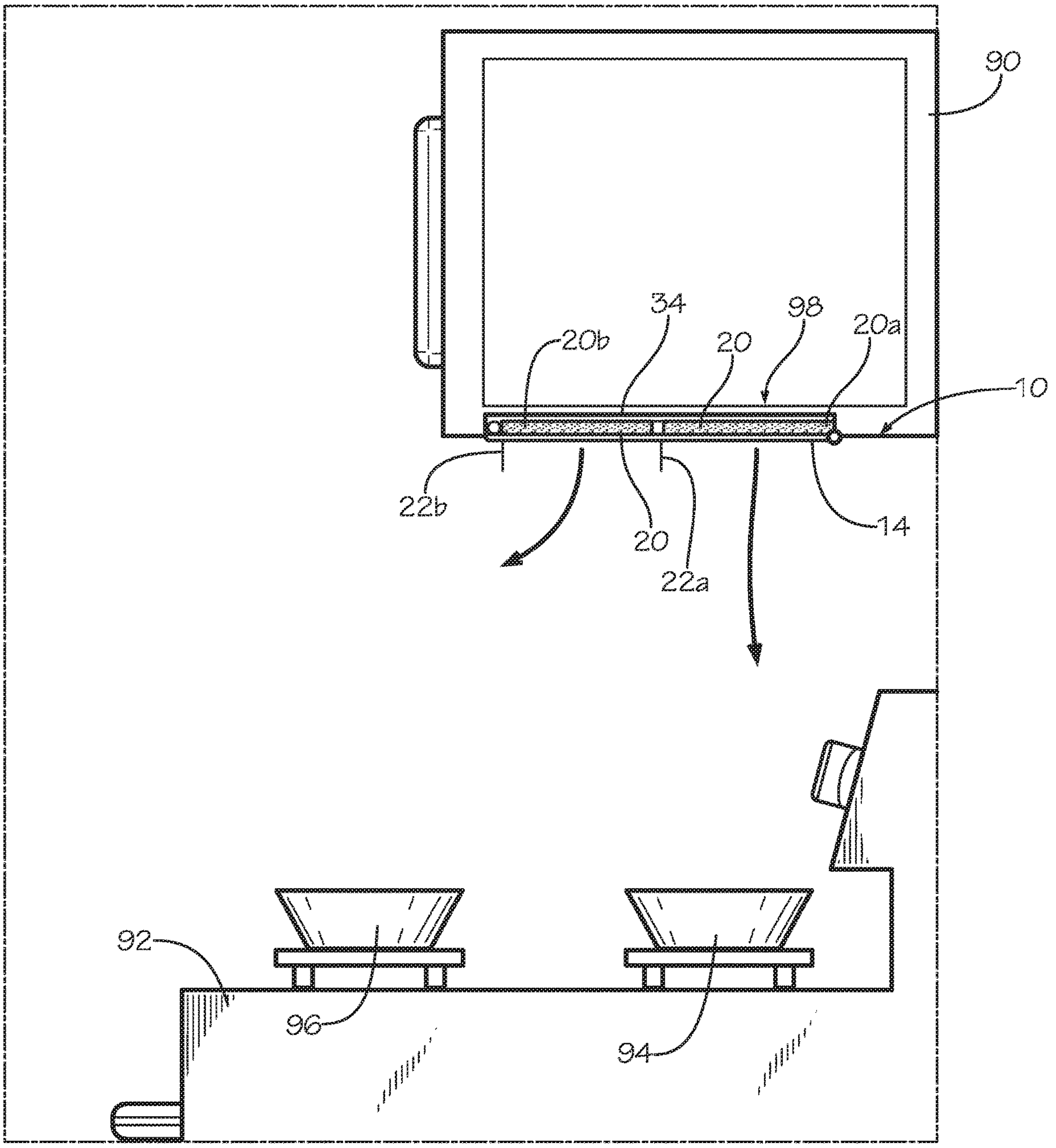
FIG. 18 is side cross sectional view of a microwave including a fire extinguishing apparatus integrated into the microwave.

Another aspect of the present disclosure is a microwave 90 with a built in fire extinguishing apparatus 10, as shown in FIG. 18. The microwave 90 can include an inner compartment 98 and a closure 14 movable between an open position and a closed position. In some embodiments, the movable closure 14 can be pivotally connected to the microwave 90. The microwave 90 can be installed in a kitchen unit over a stovetop 92 with the compartment 98 positioned over a first back burner 94 of the stovetop 92. A projection member 34 can be positioned in the compartment 98, the projection member 34 movable between a retracted position and an extended position. The projection member 34 can be retained in the retracted position when the closure 14 is in the closed position. A supply of fire suppressant material 20 can be retained in the compartment 98 when the projection member 34 is retained in the retracted position and the closure 14 is retained in the closed position. A heat responsive actuator 22 can be disposed on the microwave 90. The heat responsive actuator 22 can be positioned to respond to or be actuated by a fire on the stovetop 92. When the heat responsive actuator 22 is actuated by a fire on the stovetop 92, the closure 14 can move to the open position and the projection member 34 can move to the extended position, the projection member 34 forcing a second burner portion 20*b* of the fire suppressant material 20. A first burner portion 20*a* of the fire suppressant material 20 can fall from the compartment 98 onto a first burner 94 of the stovetop 92 when the fire extinguishing apparatus 10 is actuated. As such, the fire extinguishing apparatus 10 can drop or force fire suppressant material on multiple burners of the stovetop.

Conventional microwaves can include a central venting and lighting feature on an underside of the microwave, such that the venting and lighting system and cent and illuminate a stovetop beneath the microwave, respectively, when a stovetop is in use. In some embodiments, the microwave 90 of the present disclosure can include a similar central venting and lighting feature, and the microwave 90 can include a first fire extinguishing apparatus and a second fire extinguishing apparatus positioned on either side of the central venting and lighting feature. Each apparatus can help extinguish fires on a corresponding pair of front and back burners on a stovetop positioned beneath the microwave 90.

As shown in FIGS. 19-27, another aspect of the present disclosure is an apparatus 10 for extinguishing a fire on a stovetop having a first burner, a microwave positioned above the stovetop. The apparatus 10 includes a container 12 detachably mountable to the microwave, the container having a closure 14 movable between a closed position and an open position. A reservoir 21 can be positioned within the container 12. A supply of fire suppressant material 20 including at least a first burner portion 20*a* can be disposed within the reservoir 21. A reservoir cover 100 can be disposed over the reservoir 21 to retain the first burner portion 20*a* of the supply of fire suppressant material 20 in the reservoir 21. The reservoir cover 100 can be coupled to the closure 14. A heat responsive actuator 22 can be disposed on the container 12 such that when the container 12 is mounted to the microwave over the first burner, and the fire on the stovetop actuates the heat responsive actuator 22, the closure 14 is configured to move from the closed position to the open position, the closure 14 forcing at least a portion of the reservoir cover 100 away from the reservoir 21 to allow the first burner portion 20*a* of the supply of fire suppressant material 20 to fall towards the first burner.

Figure 19:
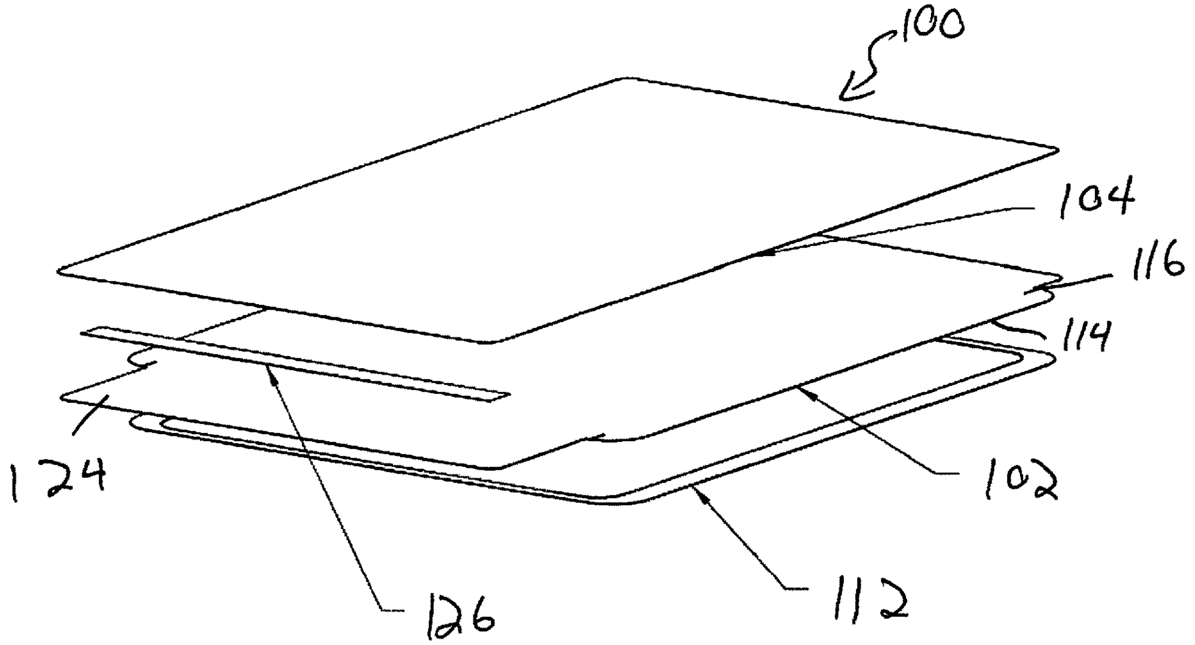
FIG. 19 is an exploded view of an embodiment of a reservoir cover or a projection member cover.
Figure 20:
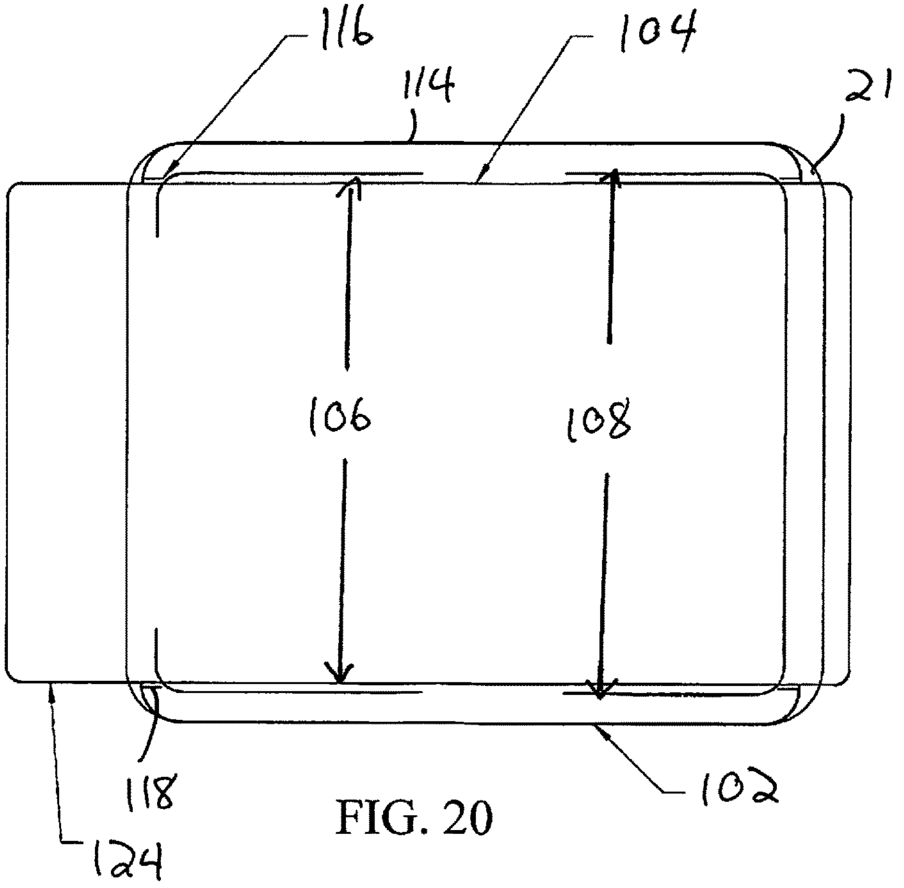
FIG. 20 is a top view of a projection member cover positioned on a projection member.
Figure 21:
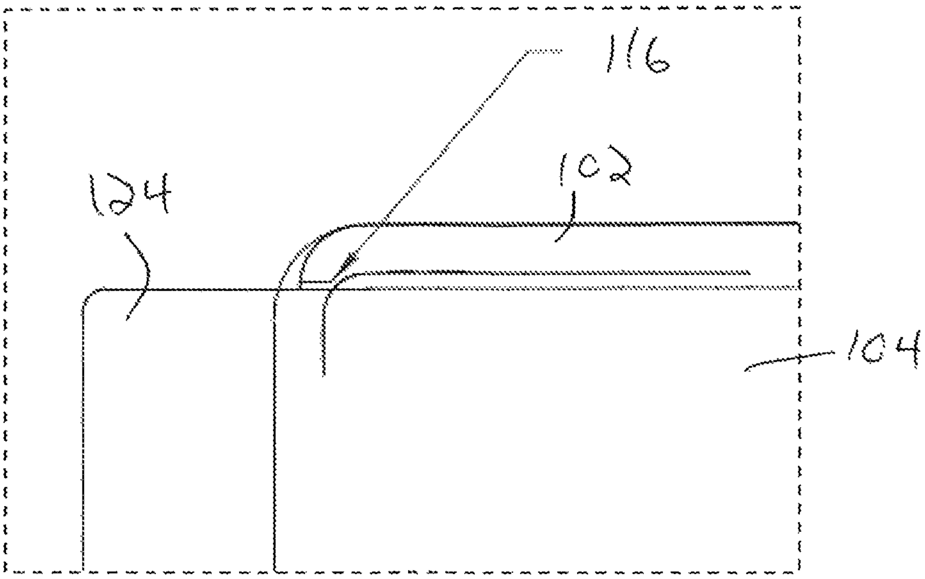
FIG. 21 is detailed view of the projection member of FIG. 20.
Figure 22:
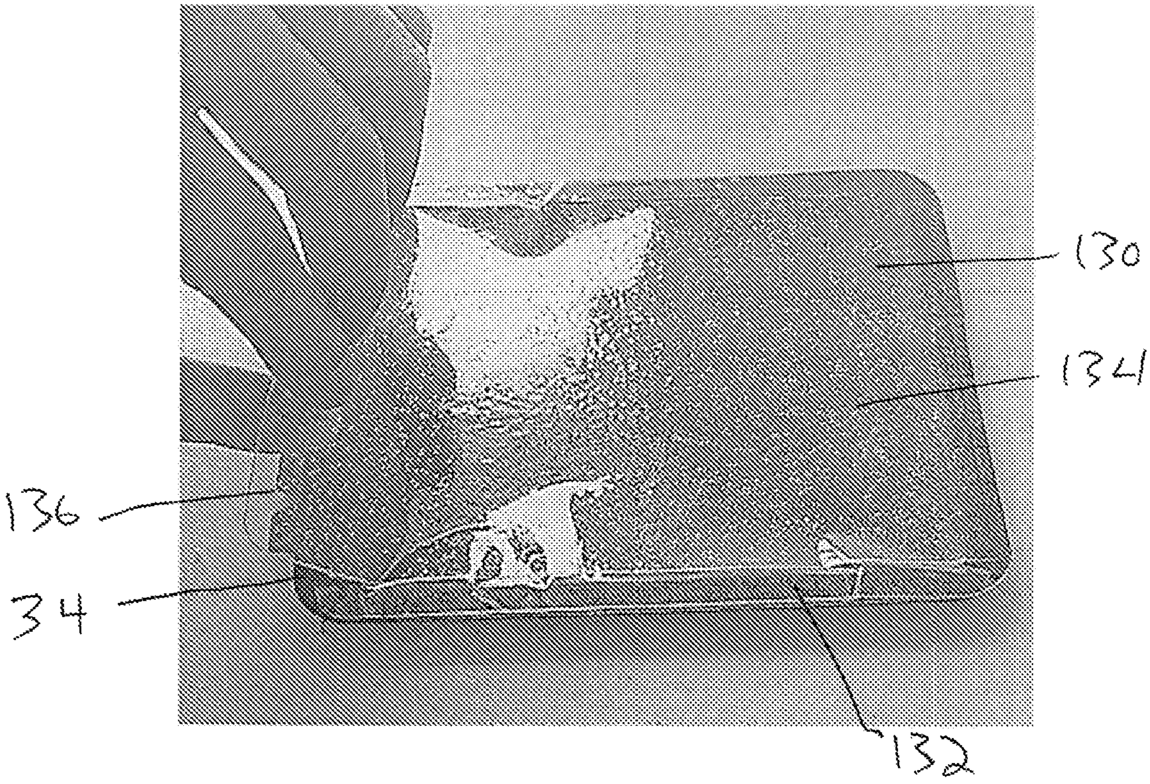
FIG. 22 is a perspective view of the projection member cover of FIG. 20 being pulled back from the projection member.
Figure 23:
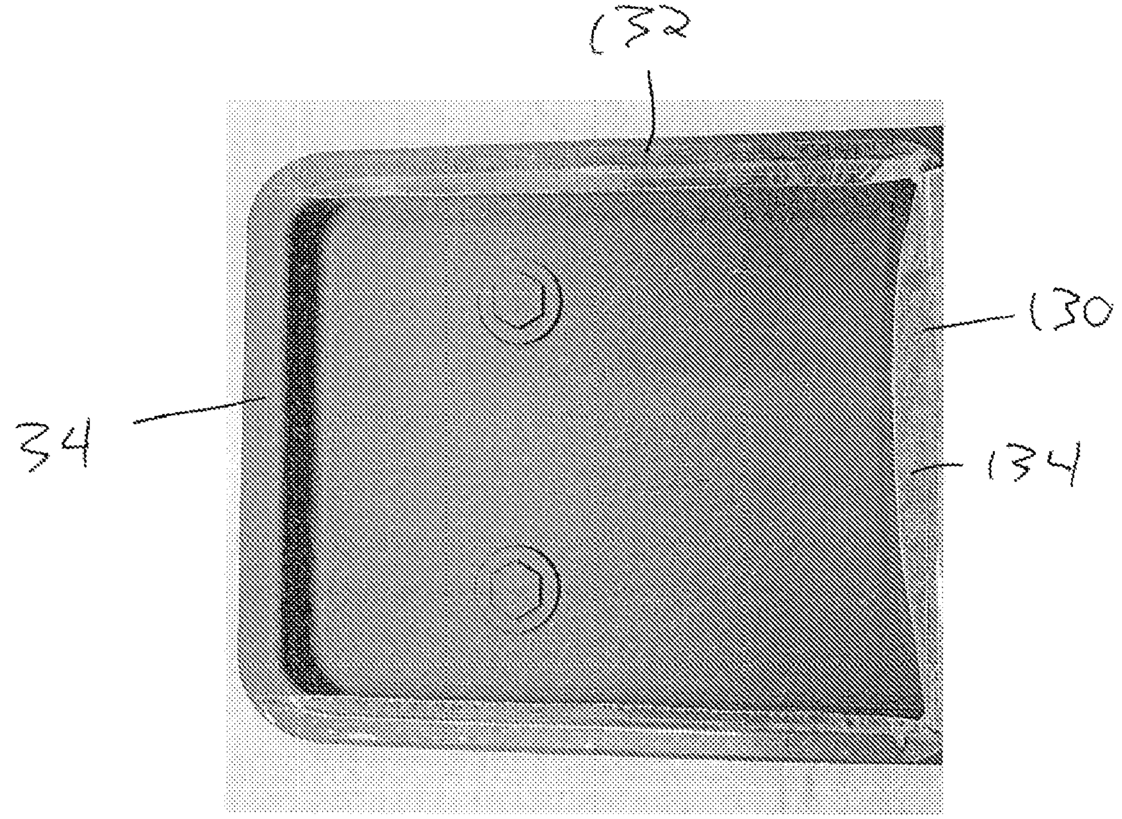
FIG. 23 is a top perspective view of the projection member cover of FIG. 22 pulled back completely from the projection member.
Figure 24:
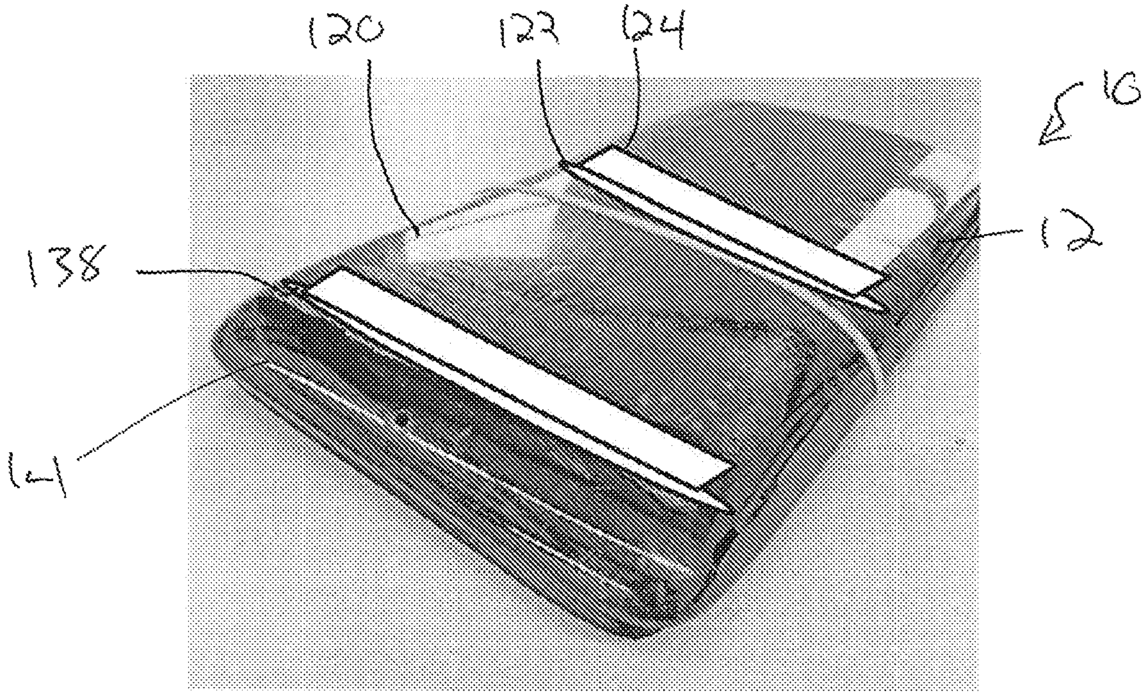
FIG. 24 is top perspective view of an embodiment of an apparatus of the present disclosure with a closure in a closed position, and tabs for a reservoir cover and a projection member cover extending through slots in the closure and coupled to the closure.
Figure 27:
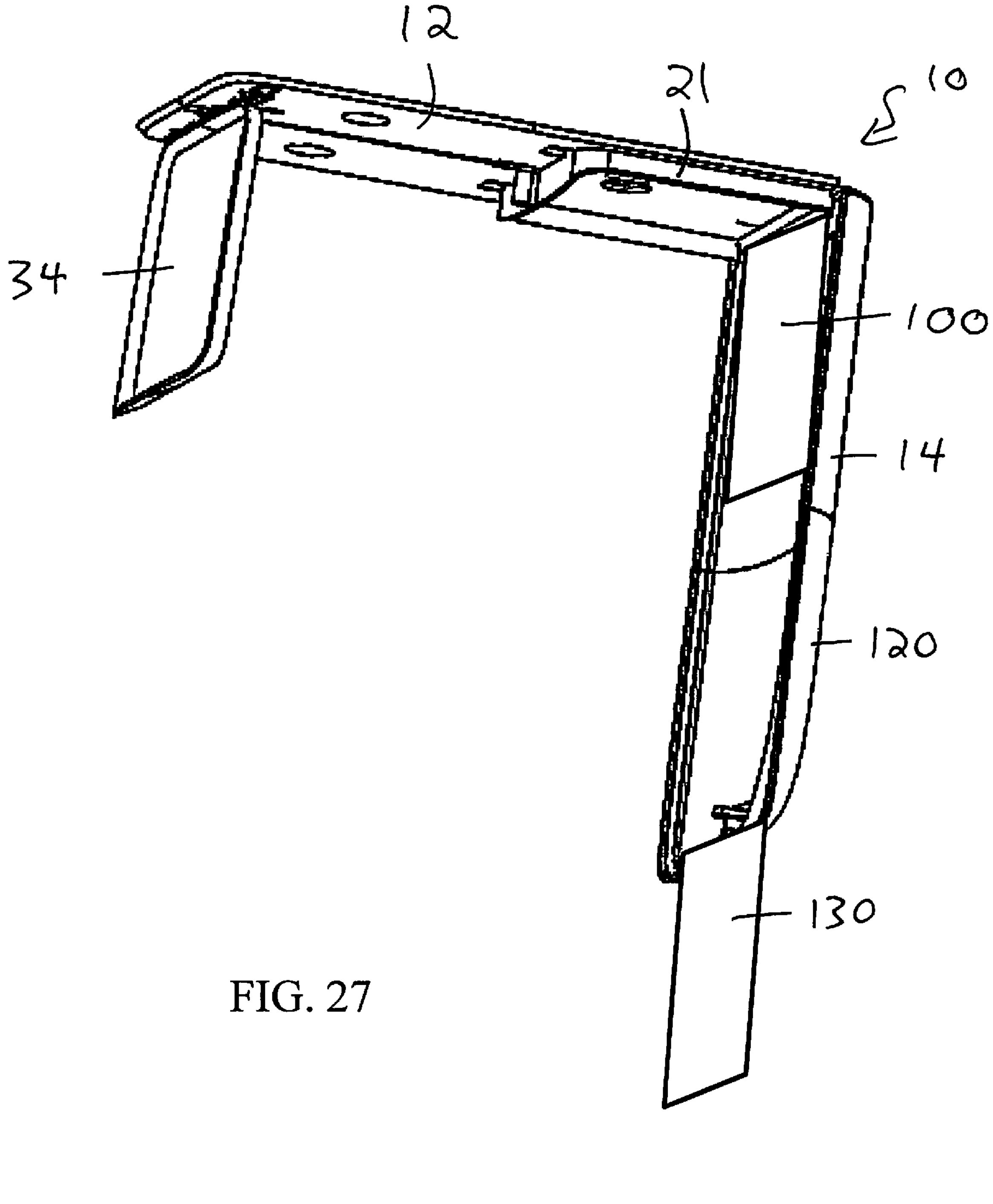
FIG. 27 is a side perspective view of the apparatus of FIG. 24 deployed.

As shown in FIGS. 19-21, in some embodiments the reservoir cover 100 can further include a first layer 102 secured to the reservoir 21 and a second layer 104 disposed over the first layer 102. In some embodiments, the second layer 104 can be thicker than the first layer 102 in some embodiments. The larger thickness of the second layer 104 can resist tearing such that the first layer 102 can tear generally along the second layer 104 as the reservoir cover 100 is forced away from the reservoir 21 via the closure 14 during actuation of the apparatus 10. In some embodiments, the second layer 104 can have a width 106 that is substantially equal to a width 108 of the reservoir 21 and the second layer 104 can be positioned on the first layer 102 such that the second layer substantially spans the width 108 of the reservoir 21. As such, when the reservoir cover 100 is forced away from the reservoir 21, the tearing of the first layer 102 exposed substantially all an opening 110 of the reservoir 21, as shown in FIG. 27. Such a configuration can help ensure that fire suppressant material 20 is not caught within the reservoir 21 during actuation of the apparatus 10. Ensuring that as much fire suppressant material 20 is released from the reservoir 21 during actuation can help ensure that a fire on the stovetop is effectively suppressed or extinguished. The second layer 104 can thus define one or more tear lines along which the first layer 102 tears as the closure 14 moves from the closed position to the open position.

The reservoir 21 can have an annular side wall 110, and the first layer 102 can be adhered to the annular side wall 110 of the reservoir 21 via an annular adhesive ring 112 to seal the first burner portion 20*a* of the supply of fire suppressant material 20 within the reservoir 21 prior to the closure 14 moving from the closed position to the open position. In some embodiments, the first layer 102 includes a perimeter 114 and a tear slit 116 extending inward from the perimeter 114 of the first layer 102 adjacent the second layer 104. The tear slit 116 can act as a tear starting point during actuation of the apparatus 10 such that when the closure 14 applies a force on the reservoir cover 100, the tearing of the first layer 102 can be initiated at the tear slit 116 adjacent the second layer 104 and continue along the edges of the second layer 104. In some embodiments, the tear slit 116 extends from the perimeter 114 of the first layer 102 but the tear slit 116 does not extend beyond the annular side wall 110 of the reservoir 21 prior to the closure 14 moving from the closed position to the open position, such that tear slit 116 does not disrupt the seal created from the adhesion of the first layer 102 to the annular side wall 110 of the reservoir 21. In some embodiments, the first layer 102 can include a second tear slit 118, the first and second tear slits 116 and 118 positioned on the first layer 102 at opposing lateral edges of the second layer 104, such that during the actuation of the apparatus 10, the first and second tear slits 116 and 118 can start or initiate generally parallel tear lines in the first layer 102 along the lateral edges of the second layer 104.

In some embodiments, the closure 14 can include an outer surface 120 and a slot 122 extending through the closure and positioned adjacent the reservoir 21 when the closure 14 is in the closed position. The reservoir cover 21 can include a tab 124 which can be extended through the slot 122 in the closure 14 and adhered to the outer surface 120 of the closure 14 via a tab adhesive member 126 to couple the reservoir cover 100 to the closure 14. The tab 124 can be defined on either the first or second layers 102 and 104 respectively of the reservoir cover 100. Having a tab 124 on the reservoir cover 100 which can extend through a slot 122 in the closure 14 and be adhered to an outer surface 120 of the closure 14 can facilitate manufacturing of the apparatus 10 as the manufacturer can visibly detect and proper coupling of the reservoir cover 100 with the closure 14 to ensure a proper release of the fire suppressant material 20 from the reservoir 21 during actuation of apparatus 10.

Figure 25:
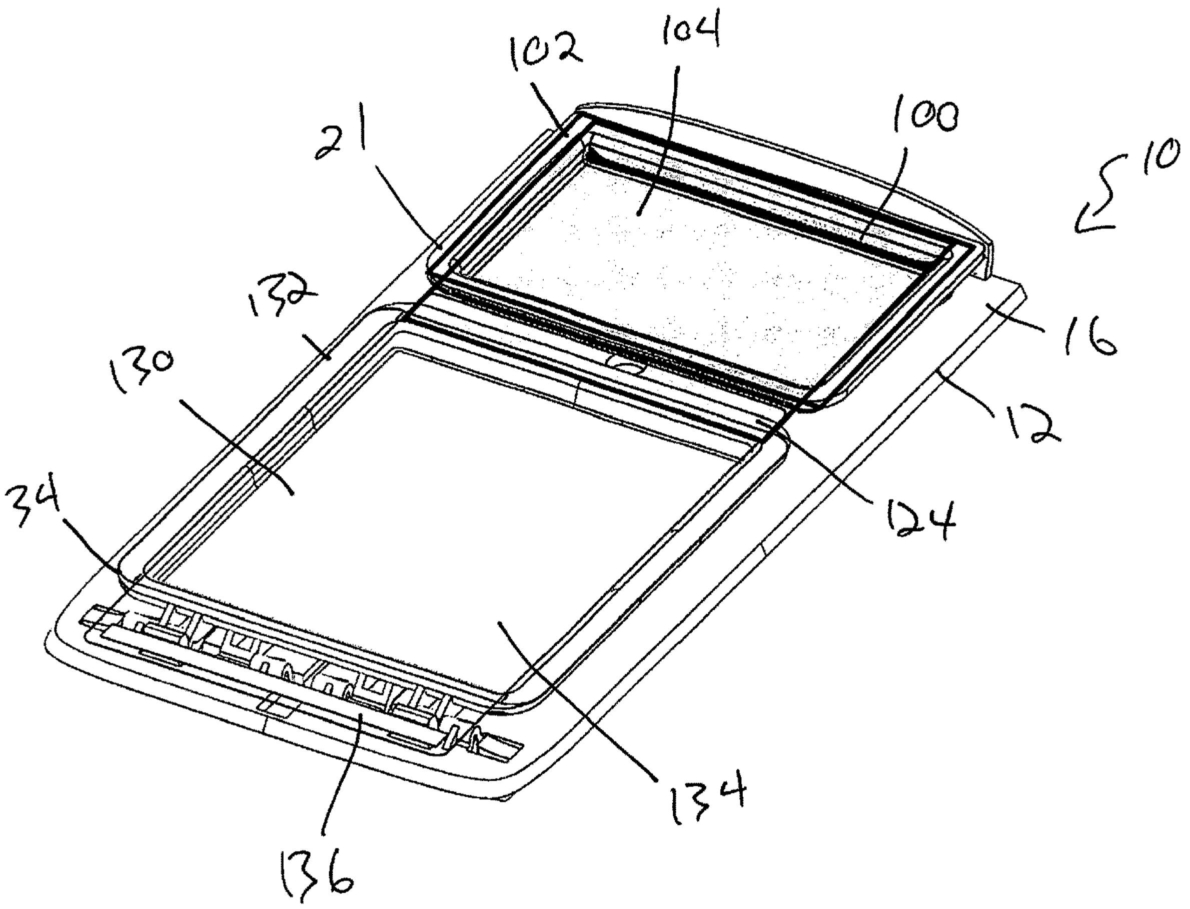
FIG. 25 is top perspective view of the apparatus of FIG. 24 with the closure removed.
Figure 26:
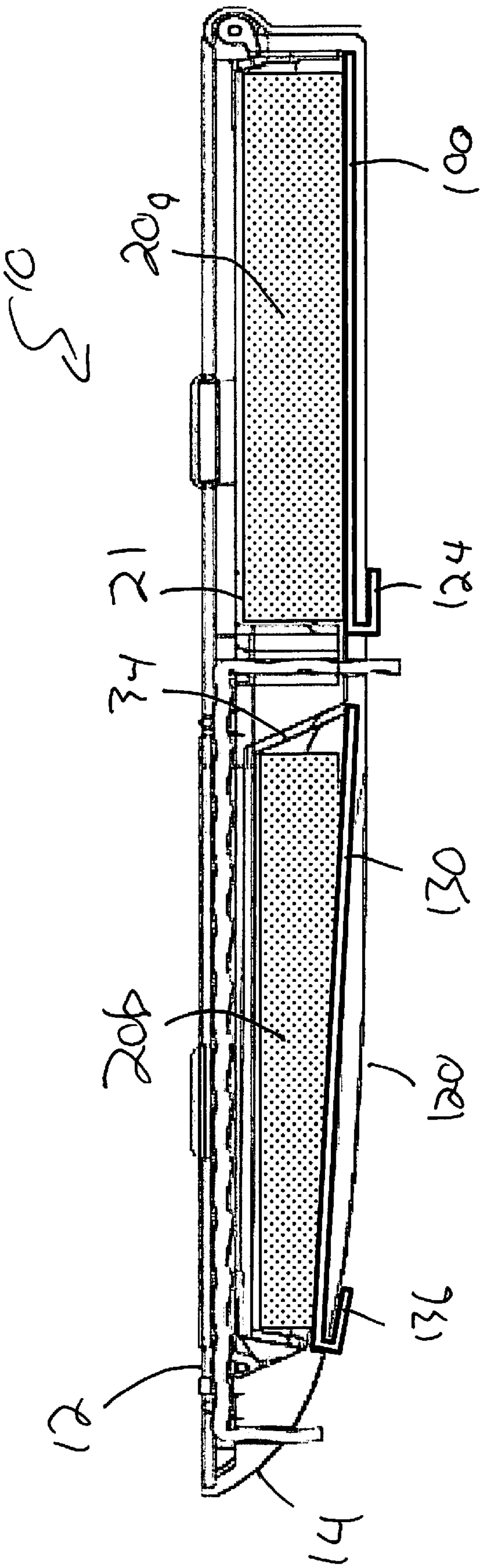
FIG. 26 is a cross sectional view of the apparatus of FIG. 24.

In some embodiments, the stovetop further comprises a second burner, and the apparatus 10 can further include a projection member 34 pivotally connected to the container 12, as shown in FIGS. 25-27. The projection member 34 can be retained in a retracted position within the container 12 while the closure 14 is in the closed position. The supply of fire suppressant material 20 can have a second burner portion 20*b* disposed within the projection member 34. When the closure 14 moves to the open position, the projection member 34 can move to an extended position and force the second burner portion 20*b* of the supply of fire suppressant material 20 toward the second burner. In such embodiments, the apparatus 10 can further include a projection member cover 130 disposed over the projection member 34 to retain the second burner portion 20*b* of the supply of fire suppressant material 20 in the projection member 34 prior to actuation, the projection member cover 130 coupled to the closure 14. When the closure 14 moves from the closed position to the open position, the closure 14 can force at least a portion of the projection member cover 130 away from the projection member 34 to allow the second burner portion 20*b* of the supply of fire suppressant material 20 to be directed towards the second burner. In some embodiments, during actuation the projection member cover 130 is substantially removed from the projection member 34, as shown in FIG. 27, such that when the closure moves from the closed position to the open position, the projection member cover 130 does not interfere with the falling of the first burner portion 20*a* of the fire suppressant material 20 toward the first burner.

In some embodiments, the projection ember cover 130 can be similar to the reservoir cover 100 in that the projection member cover 130 can have a first layer 132 adhered to the projection member 34 and a second layer 134 adhered to the first layer. The second layer 134 of the projection member cover 130 can be thicker than the first layer 132 to define tear lines along which the first layer 132 can tear during actuation. The projection member cover 130 can also include a projection member cover tab 136 which can be extended through a second slot 138 in the closure 14 and adhered to the outer surface 120 of the closure 14.

The reservoir cover 100 and the projection member cover 130 can be utilized to retain fire suppressant material 20 inside the reservoir 21 and projection member 34 respectively until the apparatus 10 is actuated. Manufacturing can be made easier as the manufacturer is not having to deal with loose fire suppressant material 20 in the reservoir 21 or projection member as the projection member is being placed in the retracted position and closure 14 secured in the closed position during assembly.

Thus, although there have been described particular embodiments of the present invention of a new and useful STOVE TOP FIRE EXTINGUISHING DEVICE, it is not intended that such references be construed as limitations upon the scope of this invention.

What is claimed is:

1. An apparatus for extinguishing a fire on a stovetop having a first burner and a second burner, a microwave positioned above the stovetop, the apparatus comprising:
- a container including a frame detachably mountable to the microwave with a plurality of magnets;
- a projection member connected to the frame, the projection member movable between a retracted and an extended position;
- a supply of fire suppressant material retained within the container when the projection member is in the retracted position;
- a heat responsive actuator disposed on the container;
- wherein when the supply of fire suppressant material is retained within the container, the container is mounted to the microwave over the first burner, the fire is on the second burner of the stovetop, and the fire actuates the heat responsive actuator, the projection member moves to the extended position to allow at least a portion of the supply of fire suppressant material to fall towards the second burner.

2. The apparatus of claim 1, wherein the container further comprises a closure movable from a closed position to an open position with respect to the frame, the closure retaining the supply of fire suppressant material within the container when the closure is in the closed position, and when the fire actuates the heat responsive actuator, the closure moves to the open position.

3. The apparatus of claim 1, wherein the second burner is positioned in a frontward direction from the first burner on the stovetop, and when the projection member moves to the extended position, the projection member moves in the frontward direction.

4. The apparatus of claim 1, wherein the projection member is pivotally attached to the frame, and when the fire actuates the heat responsive actuator, the projection member pivots from the retracted position to the extended position in the frontward direction.

5. The apparatus of claim 1, further comprising an angular stop extending from the frame, the angular stop positioned to stop the projection member as the projection member moves to the extended position to allow at least a portion of the supply of fire suppressor material to fall toward the second burner.

6. The apparatus of claim 1, wherein the projection member is biased toward the extended position.

7. The apparatus of claim 1, further comprising a second heat responsive actuator, wherein when the fire is on the first burner, the second heat responsive actuator can be positioned to be actuated by the fire on the first burner and release at least a portion of the supply of fire suppressant material toward the first burner.

8. The apparatus of claim 1, wherein the heat responsive actuator is a fuse wire, the fuse wire burning when exposed to the fire on the stove top.

9. The apparatus of claim 1, wherein the fuse wire retains the projection member in the retracted position such that when the fuse wire is lit from the fire on the second burner, the projection member is allowed to move from the retracted position to the extended position.

10. The apparatus of claim 1, further comprising a closure connected to the frame, the closure movable from a closed position an open position, the closure retaining the projection member in the retracted position when the closure is in the closed position, the fuse wire retaining the closure in the closed position, wherein when the fuse wire is actuated by the fire on the second burner, the closure moves to the open position to allow the projection member to move to the extended position.

11. The apparatus of claim 1, wherein:

the heat responsive actuator includes a first actuator portion extending from a first location on the container and a second actuator portion extending from a second location on the container when the heat responsive actuator is engaged with the container; and the container is mountable to the microwave such that the first actuator portion of the heat responsive actuator is positioned to react to a fire on the first burner and the second actuator portion is positioned to react to a fire on the second burner of the stovetop.

12. An apparatus for extinguishing a fire on a stovetop having a first burner and a second burner, a microwave positioned above the stovetop, the apparatus comprising:

a container including a frame detachably mountable to the microwave via a plurality of magnets;

a projection member pivotally connected to the frame, the projection member movable between a retracted and an extended position;

a supply of fire suppressant material retained within the container when the projection member is in the retracted position;

a heat responsive actuator disposed on the container;

wherein when the supply of fire suppressant material is retained within the container, the container is mounted to the microwave over the first burner, the fire is on the second burner of the stovetop, and the fire actuates the heat responsive actuator, the projection member moves in a frontward direction toward the second burner to the extended position to allow at least a portion of the supply of fire suppressant material to fall towards the second burner.

13. The apparatus of claim 12, further comprising a plurality of magnets positioned on the frame, the plurality of magnets oriented to detachably mount the container to the microwave.

14. An apparatus for extinguishing a fire on a stovetop having a first burner and a second burner, a microwave positioned above the stovetop, the apparatus comprising:

a container including a frame detachably mountable to the microwave via a plurality of magnets;

a projection member pivotally connected to the frame, the projection member movable between a retracted and an extended position;

a supply of fire suppressant material retained within the container when the projection member is in the retracted position;

a heat responsive actuator disposed on the container;

wherein when the supply of fire suppressant material is retained within the container, the container is mounted to the microwave over the first burner, the fire is on the second burner of the stovetop, and the fire actuates the heat responsive actuator, the projection member moves in a frontward direction toward the second burner to the extended position to allow at least a portion of the supply of fire suppressant material to fall towards the second burner.

* * * * *